United States Patent [19]
McGarity

[11] Patent Number: 5,687,349
[45] Date of Patent: Nov. 11, 1997

[54] DATA PROCESSOR WITH BRANCH TARGET ADDRESS CACHE AND SUBROUTINE RETURN ADDRESS CACHE AND METHOD OF OPERATION

[75] Inventor: Ralph C. McGarity, Austin, Tex.

[73] Assignee: Motorola, Inc., Schaumburg, Ill.

[21] Appl. No.: 718,756

[22] Filed: Sep. 23, 1996

Related U.S. Application Data

[62] Division of Ser. No. 418,049, Apr. 7, 1995, Pat. No. 5,606,682.

[51] Int. Cl.$^6$ .................................................. G06F 12/08
[52] U.S. Cl. ..................... 395/464; 395/403; 395/450
[58] Field of Search ............................ 395/580, 581, 395/586, 464, 414, 421.03, 403, 450, 452, 453, 421.04

[56] References Cited

U.S. PATENT DOCUMENTS

| | | | |
|---|---|---|---|
| 5,426,764 | 6/1995 | Ryan | 395/414 |
| 5,619,662 | 4/1997 | Steely, Jr. et al. | 395/392 |

*Primary Examiner*—Matthew M. Kim
*Attorney, Agent, or Firm*—Lee E. Chastain

[57] ABSTRACT

A data processor (10) has a branch and link address cache ($^{++}$BLAC$^{++}$) (40) and a Branch Target Address Cache (BTAC) (48) for storing a number of recently encountered fetch address-target address pairs. The BLAC buffers data pairs identifying corresponding subroutine call and subroutine return instructions each time data processor executes a particular subroutine. Upon the second call of the subroutine, control logic (44) stores the half of the data pair identifying the subroutine return instruction and data identifying the return address in the BTAC. The data processor is thereby able to predict the target address of a subroutine return instruction as it is able to predict the target address of traditional branch instructions.

4 Claims, 19 Drawing Sheets

| ADDRESS 10 | INSTRUCTION |
|---|---|
| ⋮ | ⋮ |
| 1000 | BLR 2000 |
| 1004 | NEXT INSTRUCTION A |
| ⋮ | ⋮ |
| 2000 | MFLR, Rn |
| 2004 | STW RN, MEM |
| ⋮ | ⋮ |
| 2192 | LWZ, MEM, Rn |
| 2196 | MTLR Rn |
| 2200 | BCLR |
| ⋮ | ⋮ |
| 3000 | BLR 2000 |
| 3004 | NEXT INSTRUCTION B |
| ⋮ | ⋮ |

Addresses 2000–2200 are SUB-ROUTINE 52.

DATA PROCESSOR WITH BRANCH TARGET ADDRESS CACHE AND SUBROUTINE RETURN ADDRESS CACHE AND METHOD OF OPERATION

This is a divisional of application No. 08/418,049 filed Apr. 7, 1995, now U.S. Pat. No. 5,606,682 issued Feb. 25, 1997.

FIELD OF THE INVENTION

The present invention generally relates to digital computing systems, and more specifically to a data processor with branch prediction capabilities.

BACKGROUND OF THE INVENTION

Branch prediction is one technique used to improve data processor performance. If the operands on which a branch instruction depends are not available, then a data processor must either predict the outcome of the branch instruction or must stall the branch instruction until the operands are available. If the data processor stalls, or delays executing the branch instruction, then it can not determine what instructions it needs next. Such a delay will significantly impact the performance of the data processor.

Data processors that use branch prediction techniques make a "guess" each time they receive a branch instruction, act on the guess, and then determine if the guess was correct by executing the instruction. Such a data processor guesses whether a branch will ultimately be taken and "jump" to a new instruction address or whether it will not be taken and "fall through" to the next sequential instruction. Data processors that predict branch instructions gain performance because they can make an accurate guess faster than they can fully execute the branch instruction. These data processors then need only correct wrong guesses.

Branch target address caches ("BTACs") are devices used to make branch predictions. BTACs contain addresses to which the data processor has recently branched. These "branch targets" are indexed by the address of the branch instruction which generated them. The data processor will search the BTAC once it determines the address of any instruction that it should execute. If the address corresponds to a valid entry in the BTAC, then the data processor assumes that the instruction is the same branch instruction and that it will take the branch again. Therefore, the data processor automatically branches to the corresponding cached target address. If the address does not correspond to any valid entry in the BTAC, then the data processor will determine the address of its next instruction by some other method. This other method may be another branch prediction technique or may be the actual execution of the branch instruction.

Subroutine return instructions are instructions which ruin the performance of BTACs. Subroutine return instructions are the second half of a subroutine call-subroutine return instruction pair. The subroutine call-subroutine return instruction pair, or its equivalent, is found in every modern computer architecture. A subroutine call instruction causes a data processor to branch to an address specified in the instruction (a subroutine) and to store the value of the instruction pointer or fetch address in a particular register or memory location. The contents of the instruction pointer or fetch address specifies the address of the next instruction that the data processor is to fetch from memory at any given time. In this case, the instruction pointer specifies the address of the instruction immediately following the subroutine call instruction. Conversely, the subroutine return instruction causes the data processor to branch to an instruction indexed by the address stored in the same particular register or memory location. The subroutine call and return instructions may be conditioned upon some particular bit value or may be unconditional.

Subroutine return instructions ruin the performance of BTACs because they do not branch to the same address repeatedly. Instead, subroutine return instructions branch to the instruction immediately following the instruction that initially called the subroutine. By definition, programmers form particular portions of a computer program into discrete subroutines because they call the subroutines from many points in a particular program. Consequently, BTACs often miss-predict each subroutine return instruction, speculatively jumping to the return address which the data processor generated at the end of a prior call. As a result, data processor designers often omit subroutine return instructions from their BTAC algorithms.

SUMMARY OF THE INVENTION

In accordance with the present invention, there is disclosed a method of operating a data processor with a branch target address cache which substantially eliminates disadvantages of known data processor and schemes. The disclosed method allows data for subroutine call instructions to be included in the BTAC.

The disclosed method stores a first data pair in a memory array upon the execution of a subroutine call instruction. The first data pair comprises two parts: a part that indexes the subroutine call instruction and a part that indexes the subroutine return instruction. When the data processor executes the subroutine call instruction a second time it reads the part of the pair from the memory array and stores a second data pair into branch target address cache of the data processor. The second data pair also has two parts: the second portion of the first data pair and the operand of the subroutine call instruction.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIG. 4 depicts, in tabular form, a computer program illustrative of the operation of the disclosed invention;

DETAILED DESCRIPTION OF A PREFERRED EMBODIMENT

Figure 1:
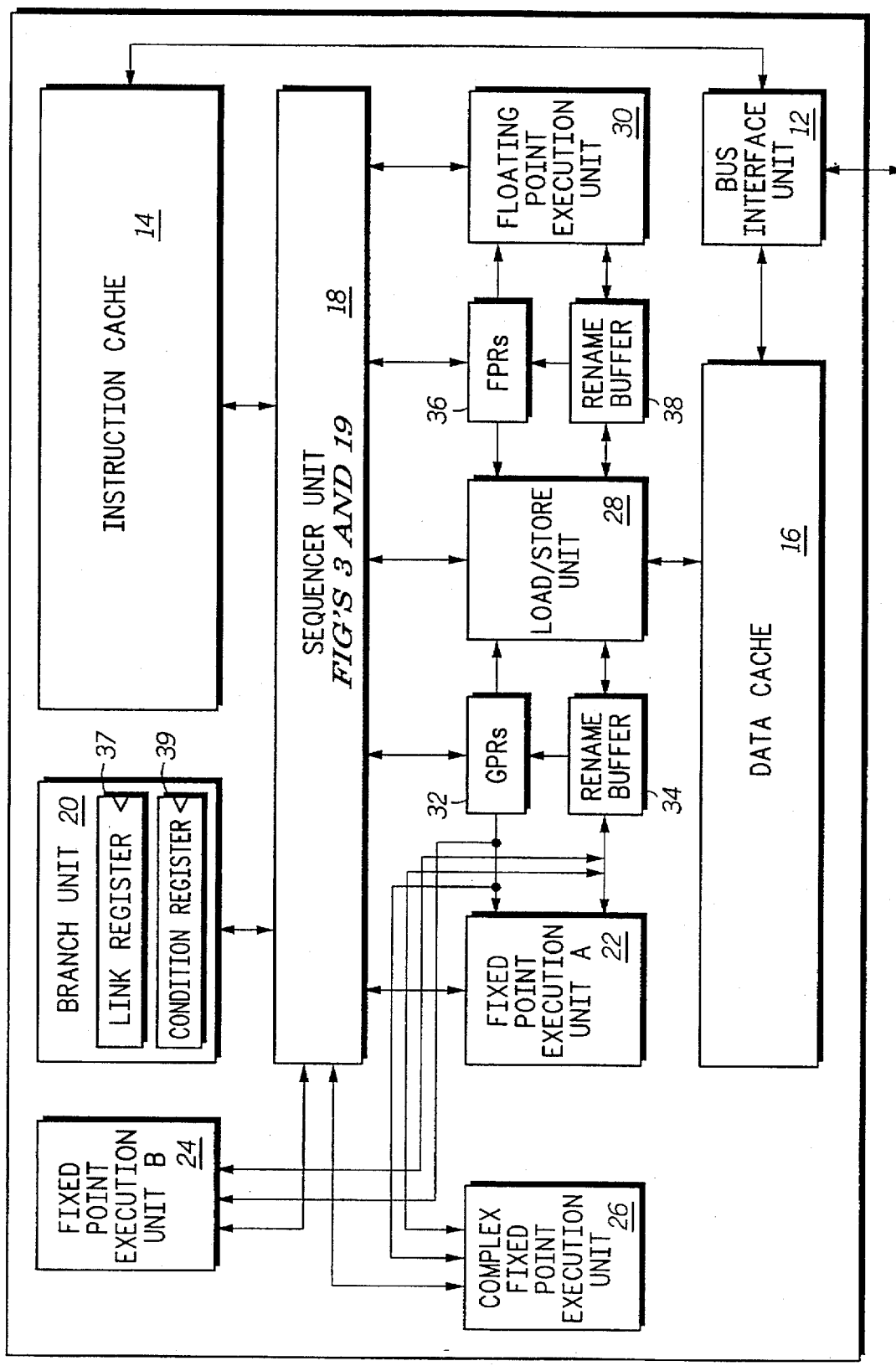
FIG. 1 depicts a block diagram of a data processor constructed in accordance with the present invention.

FIG. 1 depicts a block diagram of a data processor 10 constructed in accordance with the present invention. Data processor 10 is a data processor that improves its performance by predicting whether each branch instruction will be taken or will not be taken. Data processor 10 then fetches instructions at the predicted fetch address (a "target address") and begins executing these instructions. Later, data processor 10 resolves whether the branch should have been taken or should not have been taken and performs corrective measures if it predicted incorrectly at the earlier time. Data processor 10 incorporates a branch target address cache ("BTAC") to store a plurality of sets of fetch address-target address pairs. Data processor 10 searches the BTAC each time it generates a new fetch address. If the fetch address is present in the BTAC, then data processor 10 will immediately begin fetching instructions at the target address associated with the stored fetch address. Data processor 10 also incorporates a branch and link address cache ("BLAC" pronounced BEE-lack) to buffer a plurality of sets of fetch address-target address pairs generated by subroutine return instructions. The BLAC updates the BTAC with each buffered subroutine return fetch address and its associated return address upon the second occurrence of the subroutine call instruction. Therefore, data processor 10 is able to use its BTAC to accurately predict the target address of the subroutine return instruction before executing the instruction. The performance of data processor 10 increases whenever it is able to process an uninterrupted stream of instructions.

In the described embodiment, data processor 10 executes the PowerPC (Trademark of International Business Machines, Inc.) instruction set. However, the disclosed invention is applicable to all architectures that contain similar subroutine return instructions. In the PowerPC instruction set, the subroutine call instruction is a "branch and link" instruction. The mnemonic for the branch and link instruction is "BLR." This instruction branches to the instruction indexed by the immediate field of the BLR instruction and saves the instruction pointer or fetch address in a special purpose register called the "link register." The PowerPC subroutine return instruction is a "branch to link" instruction. The mnemonic for the branch to link instruction is "BCLR." This instruction branches to the instruction indexed by the value stored in the link register.

Continuing with FIG. 1, a bus interface unit (hereafter BIU) 12 controls the flow of data between data processor 10 and the remainder of a data processing system (not depicted). BIU 12 is connected to an instruction cache 14 and to a data cache 16. Instruction cache 14 supplies an instruction stream to a sequencer unit 18. Sequencer unit 18 is more fully described below in connection with FIGS. 3 and 19. Sequencer unit 18 forwards individual instructions to an appropriate execution unit. Data processor 10 has a branch unit 20, a fixed point execution unit A 22, a fixed point execution unit B 24, a complex fixed point execution unit 26, a load/store execution unit 28, and a floating point execution unit 30. Fixed point execution unit A 22, fixed point execution unit B 24, complex fixed point execution unit 26, and load/store execution unit 28 read and write their results to a general purpose architectural register file 32, (labeled GPRs and hereafter GPR file) and to a first rename buffer 34. Floating point execution unit 30 and load/store execution unit 28 read and write their results to a floating point architectural register file 36, (labeled FPRs and hereafter FPR file) and to a second rename buffer 38.

The operation of data processor 10 without the disclosed branch prediction methodology is known in the art. In general, branch unit 20 determines what sequence of programmed instructions is appropriate given the contents of certain data registers and the instructions themselves. Two such registers which branch unit 20 uses to predict branch instructions are a link register 37 and a condition register 39. Instruction cache 14 provides this sequence of programmed instructions to sequencer 18. If instruction cache 14 does not contain the required instructions, then it will fetch them from a main memory system external to data processor 10 (not shown). (As described below, sequencer unit 18 makes several predictions for each branch instruction before branch unit 20 finally resolves a particular branch instruction.)

Sequencer unit 18 issues the individual instructions of the sequence of programmed instructions to the various execution units 20, 22, 24, 26, 28 and 30. Each of the execution units performs one or more instructions of a particular class of instructions. The particular class of instructions of each execution unit is indicated by the name of the execution unit. For instance, fixed point execution units A and B, 22 and 24, perform simple mathematical operations on operands expressed in fixed point notation such as addition, subtraction, ANDing, ORing and XORing. Complex fixed point execution 26 performs more complex mathematical operations on operands expressed in fixed point notation such as multiplication and division. Floating point execution unit 30 performs mathematical operations on operands expressed in floating point notation such as multiplication and division.

Fixed point execution units A and B, 22 and 24, and complex fixed point unit 26 return the results of their operations to designated entries in first rename buffer 34. First rename buffer 34 updates an entry of GPR file 32 with an entry from first rename buffer 34 when all instructions preceding the instruction that generated the result have updated their GPR file entries. Sequencer unit 18 coordinates this updating. Both first rename buffer 34 and GPR file 32 can supply operands to fixed point execution units A and B, 22 and 24, and to complex fixed point unit 26.

Floating point execution unit 30 returns the results of its operations to designated entries in second rename buffer 38. Second rename buffer 38 periodically updates an entry of FPR file 36 with an entry in second rename buffer 38 when all instructions preceding the instruction that generated the result have updated their FPR file entries. Sequencer unit 18 also coordinates this updating. Both second rename buffer 38 and FPR file 36 supply operands to floating point execution unit 30.

Load/store unit 28 reads data stored in GPR file 32, first rename buffer 34, FPR file 36 or second rename buffer 38 and writes the selected data to data cache 16. This data may also be written to an external memory system (not depicted) depending upon operating characteristics of data processor 10 not relevant to the disclosed invention. Conversely, load/store unit 28 reads data stored in data cache 16 and writes the read data to first rename buffer 34 or second rename buffer 38. If data cache 16 does not contain the required dam, then it will fetch it from the main memory system external to data processor 10 via BIU 12.

The operation of data processor 10 with the disclosed branch prediction methodology is described below in connection with FIGS. 4 through 18 and 20 through 33. In general, data processor 10 is a reduced instruction set computer ("RISC"). Data processor 10 achieves high performance by breaking each instruction into a sequence of smaller steps, each of which may be overlapped in time with steps of other instructions. This performance strategy is known as "pipelining."

Figure 2:
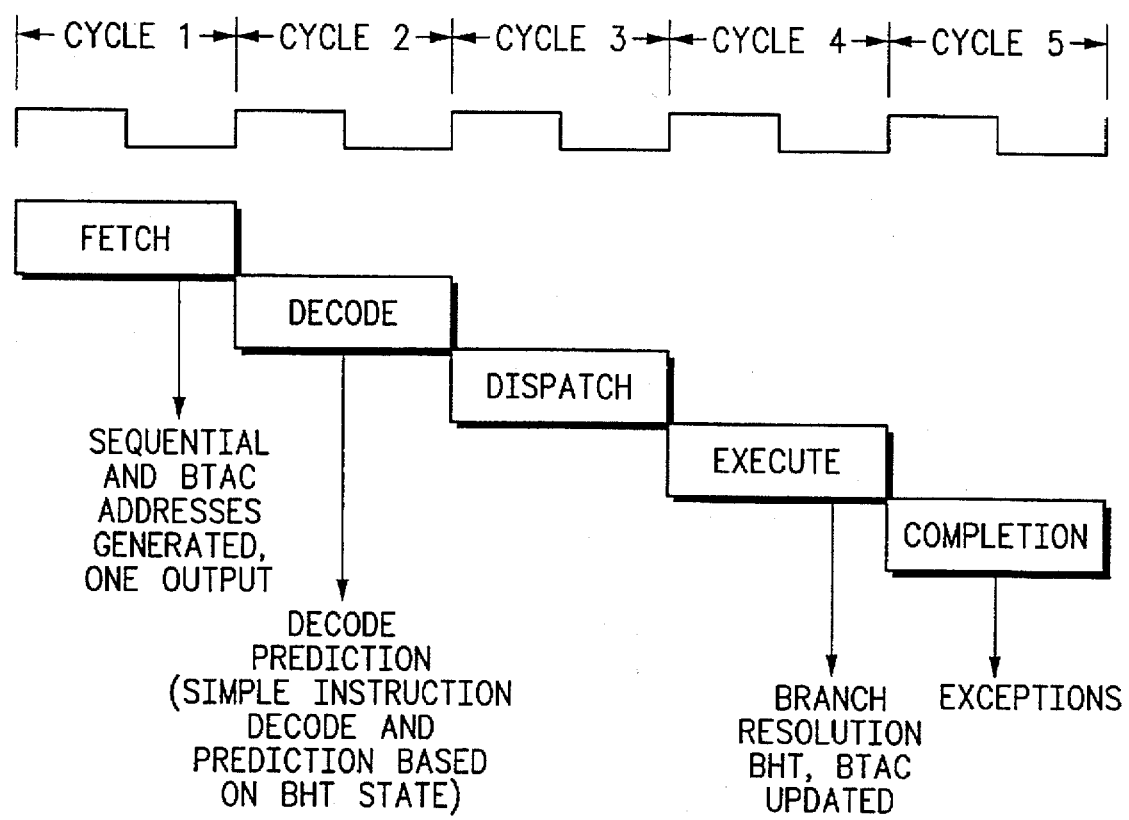
FIG. 2 depicts a timing diagram of an instruction executed by the data processor depicted in FIG. 1.

FIG. 2 depicts a timing diagram of a single instruction executed by data processor 10 depicted in FIG. 1. FIG. 2 also includes various annotations describing the timing of certain branch instruction features. In the depicted embodiment, each instruction is broken into five discrete steps: fetch, decode, dispatch, execute, and completion.

In the fetch stage, the instruction cache 14 retrieves one or more instructions beginning at a memory address identified by sequencer unit 18 or by branch unit 20 in the prior clock cycle. This memory address is called the fetch address. Sequencer unit 18 makes a first branch prediction in the fetch pipeline stage. Sequencer unit 18 uses a BTAC to store a number of pairs of fetch addresses and their corresponding target addresses for a number of recent branch instructions. Sequencer unit 18 will fetch instructions at a particular target address stored in the BTAC if its input fetch address corresponds to the fetch address of the particular target address.

In the decode stage, instructions are decoded by the sequencer unit 18 into a number of control signals for use by subsequent stages. Sequencer unit 18 makes a second branch prediction in the decode pipeline stage. Sequencer unit 18 may generate a fetch address for one or more simple branch instructions. Sequencer unit 18 maintains a history state for each recently encountered branch instruction in a branch history table ("BHT" not shown). The state of each branch instruction determines if sequencer unit 18 will predict the branch instruction taken or not taken.

In the dispatch stage, sequencer unit 18 routes each instruction to the appropriate execution unit after determining that there are no impermissible data or resource dependencies and after reserving a rename buffer entry for the result of the instruction. The dispatch stage is also responsible for supplying operand information for the instructions being dispatched.

In the execute stage, each particular execution unit executes its programmed instruction. Results, if any, are returned either to rename buffer 34 or rename buffer 38, respectively, for integer and floating point results. The contents of link register 37 and condition register 39 are available at the execute stage for final resolution of all branches. Therefore, the fetch address generated by branch unit 20 in the execute phase is not a prediction.

In the completion stage, sequencer unit 18 updates the architectural register files with the result of a particular instruction stored in a rename buffer after every instruction preceding the particular instruction has so updated the architectural register file. The completion stage also updates all other architectural states in the machine after every instruction preceding the particular instruction has so updated the architectural state.

Generally, each instruction stage takes one machine clock cycle. However, some instructions, such as complex fixed point instructions, require more than one clock cycle to execute. Therefore, there may be a delay between the execution and completion stages of a particular instruction due to the range of times which previous instructions may have taken to execute.

Figure 3:
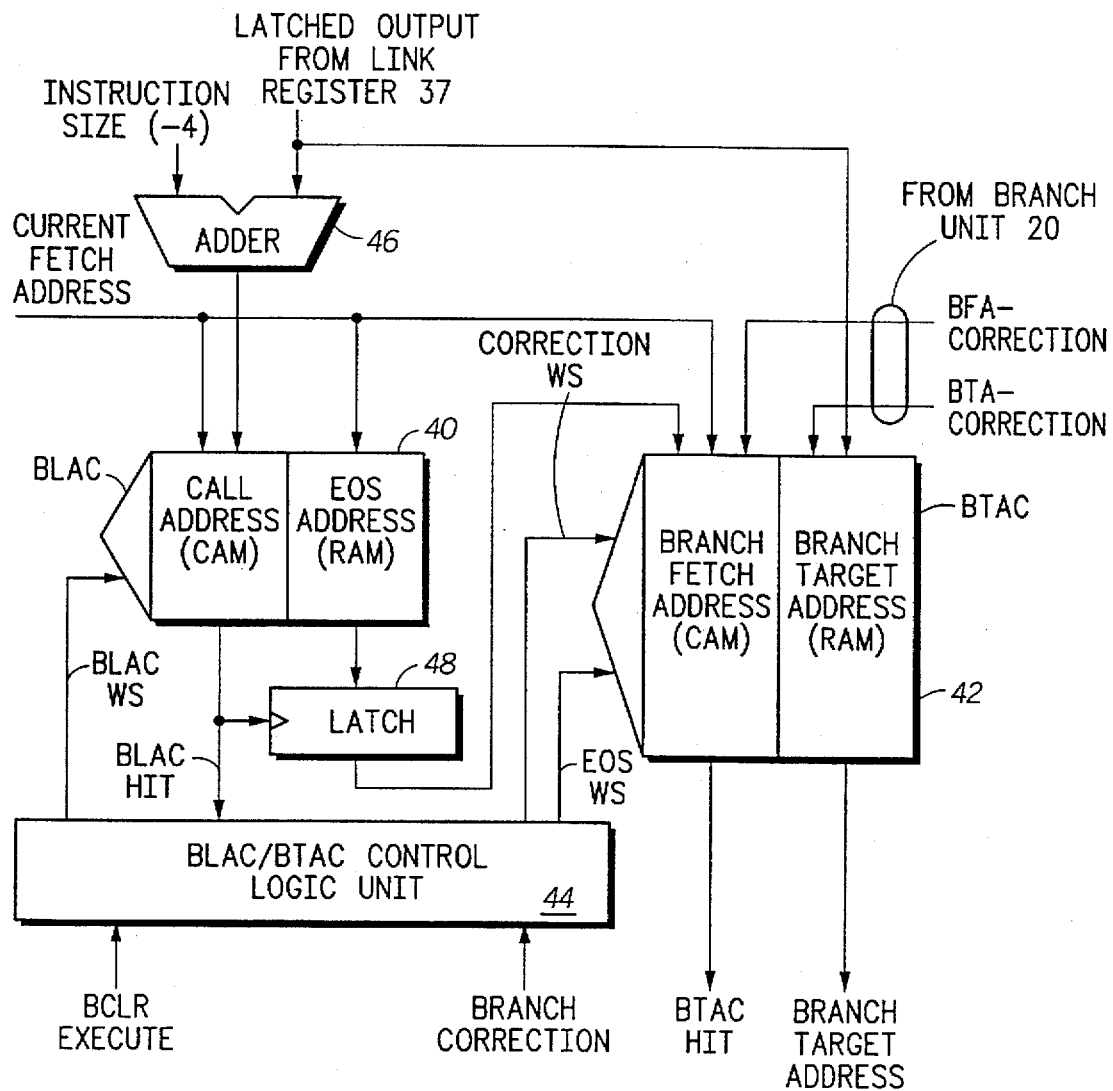
FIG. 3 depicts a block diagram of a first embodiment of a portion of the sequencer unit depicted in FIG. 1.

FIG. 3 depicts a block diagram of a first embodiment of a portion of sequencer unit 18 depicted in FIG. 1. FIG. 3 primarily depicts the circuits related to the fetch cycle operations of sequencer unit 18. In particular, the fetch cycle portion of sequencer unit 18 has a branch and link address cache (hereafter "BLAC") 40, a branch target address cache (hereafter "BTAC") 42, a BLAC/BTAC control logic unit 44, an adder 46, and a latch 48.

BLAC 40 contains N entries to simultaneously buffer up to N nested subroutine calls, where N is an integer. In the depicted embodiment, N equals eight. Each entry in BLAC 40 contains a thirty-bit CALL ADDRESS field and a thirty-bit END-OF-SUBROUTINE (labeled "EOS") ADDRESS field. The thirty CALL ADDRESS bits are stored in thirty content addressable memory ("CAM") cells. A read/compare port of the CAM cells receives the fetch address generated each cycle by another portion of sequencer unit 18 not depicted. This fetch address is the address supplied to instruction cache 14. As described above, instruction cache 14 supplies instructions to sequencer unit 18 that are indexed by this fetch address. A write port of the CAM cells receives an output of adder 46. Adder 46 adds the latched contents of link register 37 and the negative of the instruction size. This sum points to the instruction immediately preceding the location identified by link register 37. In the depicted embodiment, each instruction is four bytes long. Sequencer unit 18 latches the output of link register 37 for its use when it decodes the occurrence of a branch and link instruction in the instruction stream. The thirty EOS ADDRESS bits of BLAC 40 are stored in thirty random access memory ("RAM") cells. A write port of the RAM cells receives the current fetch address described above. A read port of the RAM cells is connected to an input of a latch 48. As described, BLAC 40 is a fully associative cache.

BLAC 40 generates a control signal BLAC HIT that is used by BLAC/BTAC control logic unit 44. BLAC 40 asserts BLAC HIT whenever an input FETCH ADDRESS matches a data value stored in one of the CALL ADDRESS CAM fields. BLAC HIT triggers latch 48 to sample and hold its input. BLAC 40 also outputs the EOS ADDRESS from the corresponding RAM field in the case of a BLAC "hit." BLAC 40 receives a control signal BLAC WRITE STROBE ("labeled "BLAC WS") from BLAC/BTAC control logic unit 44. BLAC 40 stores the output of adder 46 and the current fetch address into the CAM cells and RAM cells, respectively, of a selected entry when BLAC/BTAC control logic unit 44 asserts the control signal BLAC WS. BLAC 40 selects a particular entry during such a write operation using an algorithm not relevant to the present invention.

BTAC 42 contains M entries to simultaneously buffer up to M recently encountered branch instructions, where M is an integer. In the depicted embodiment, M equals sixty-four. Each entry contains a thirty-bit BRANCH FETCH ADDRESS field and a thirty-bit BRANCH TARGET ADDRESS field. The thirty BRANCH FETCH ADDRESS bits of BTAC 42 are stored in thirty CAM cells. A first write port of the CAM cells receives the output of latch 48. A second write port of the CAM cells receives a BRANCH FETCH ADDRESS-CORRECTION input (labeled "BFA-CORRECTION") from branch unit 20. A read/compare port of the CAM cells receives the fetch address generated each cycle. The thirty BRANCH TARGET ADDRESS bits of BTAC 42 are stored in thirty RAM cells. A first write port of the RAM cells receives the value of link register 37. A second write port of the RAM cells receives a BRANCH TARGET ADDRESS-CORRECTION input (labeled "BTA-CORRECTION") from branch unit 20. A read port of the RAM cells generates the thirty bit BRANCH TARGET ADDRESS output. Another portion of sequencer unit 18 (not depicted) will forward this address to instruction cache 14 under certain circumstances. As described, BTAC 42 is a fully associative cache.

BTAC 42 generates a control signal BTAC HIT that is used by sequencer unit 18 to qualify the output signal BRANCH TARGET ADDRESS. BTAC 42 asserts BTAC HIT whenever an input FETCH ADDRESS matches a data value stored in one of the BRANCH FETCH ADDRESS CAM fields. BTAC 42 also outputs the BRANCH TARGET ADDRESS from the corresponding RAM field in the case of a BTAC"hit" BTAC 42 receives the control signals CORRECTION WRITE STROBE (labeled "CORRECTION WS") and END-OF-SUBROUTINE WRITE STROBE (labeled "EOS WS") from BLAC/BTAC control logic unit 44. BTAC 42 stores the BFA-CORRECTION and the BTA-CORRECTION into the CAM cells and RAM cells, respectively, of a selected entry when BLAC/BTAC control logic unit 44 asserts the control signal CORRECTION WS. BTAC 42 stores the output of latch 48 and the value of link register 37 into the CAM cells and RAM cells, respectively, of a selected entry when BLAC/BTAC control logic unit 44 asserts the control signal EOS WS. BLAC 40 selects an entry during these write operations using algorithms not relevant to the present invention.

BLAC 40 and BTAC 42 are multi-ported cache structures to allow simultaneous read/compare and write/update operations. Such an occurrence is normal in a highly pipelined data processor.

In addition to the control signals described above, BLAC/BTAC control logic unit 44 receives the control signals BCLR EXECUTE from the decode portion of sequencer unit 18 (not shown) and the control signal BRANCH CORRECTION from branch execution unit 20. The decode portion of sequencer unit 18 asserts the control signal BCLR EXECUTE when it decodes a branch to link register instruction (subroutine return) in the instruction stream. Branch execution unit 20 asserts the control signal BRANCH CORRECTION after it executes a branch instruction and determines that BTAC 42 miss-predicted the target address. As described above, branch execution unit 20 also provides the signals BFA-CORRECTION and BTA-CORRECTION to BTAC 42. BLAC/BTAC control logic unit 44 asserts the control signal BLAC WS when decode portion of sequencer unit 18 asserts the control signal BCLR EXECUTE. BLAC/BTAC control logic unit 44 asserts the control signal CORRECTION WS when branch execution unit 20 asserts the control signal BRANCH CORRECTION. BLAC/BTAC control logic unit 44 asserts the control signal EOS WS when BLAC 40 asserts the control signal BLAC HIT.

FIG. 4 depicts, in tabular form, a computer program 50 useful to illustrate the operation of the disclosed invention. FIG. 4 depicts various instructions and the memory locations at which each instruction is stored (decimal address). Within computer program 50 is a subroutine 52. The first instruction within subroutine 52 is stored at memory address 2000. The last instruction within subroutine 52 is stored at memory address 2200. This final subroutine instruction is a branch to link register instruction ("BCLR"). The enhanced performance of this instruction is one advantage of the disclosed invention. Computer program 50 "calls" subroutine 52 from two different locations: (1) the branch and link instruction ("BLR") stored at memory address 1000 and (2) the branch and link instruction stored at memory address 3000. After executing subroutine 52, data processor 10 returns to the instruction immediately following the branch and link instruction that called subroutine 52. In this case, data processor 10 executes NEXT INSTRUCTION A stored at memory address 1004 after calling subroutine 52 from the BLR instruction stored at memory address 1000. Data processor 10 executes NEXT INSTRUCTION B stored at memory address 3004 after calling subroutine 52 from the BLR instruction stored at memory address 3000. The curved arrows highlight the instruction flow of computer program 50 as it executes in data processor 10.

FIGS. 5 through 18 illustrate the operation of the first embodiment of the disclosed invention depicted in FIG. 3. In particular, data processor 10 executes subroutine 52, depicted in FIG. 4, four times. First, data processor 10 calls subroutine 52 two times from the BLR instruction stored at memory address 1000. These subroutine calls are depicted in FIGS. 5 through 11. Second, data processor 10 calls subroutine 52 two times from the BLR instruction stored at memory address 3000. These subroutine calls are depicted in FIGS. 11 through 18.

Figure 5:
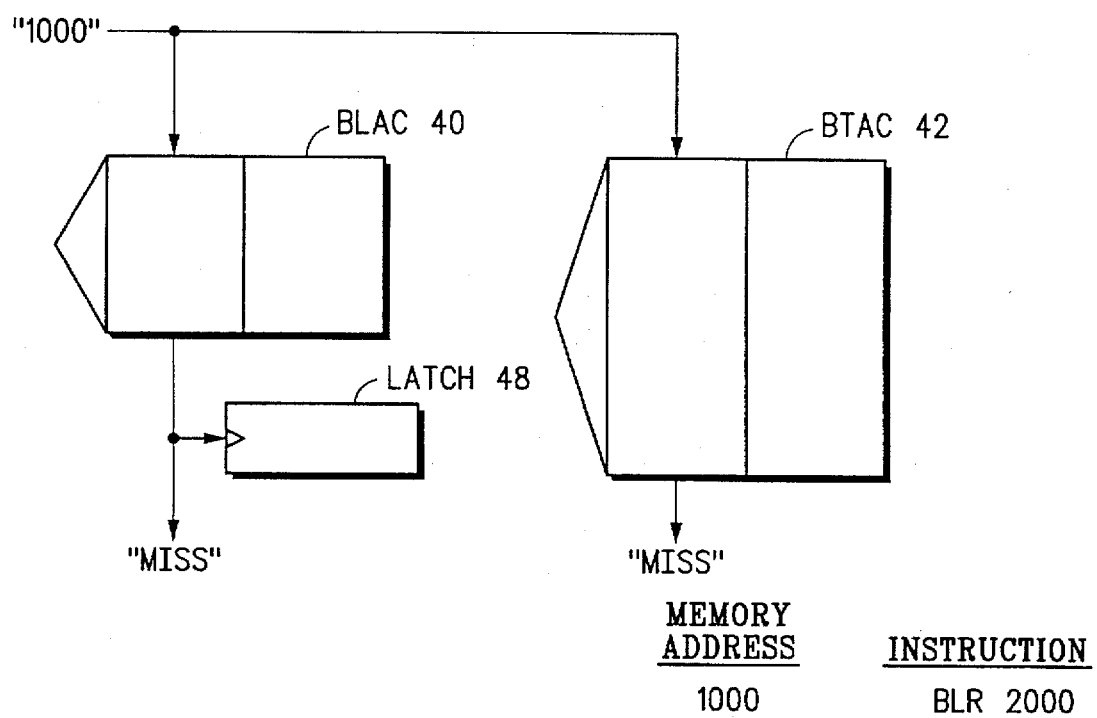
FIG. 5 through 18 illustrate the operation of the first embodiment of the disclosed invention depicted in FIG. 3.

Continuing with FIG. 5, the instruction pointer or fetch address (not shown) of data processor 10 determines that the branch and link instruction stored at memory address "1000" is the next instruction to fetch and begins processing. The branch and link instruction stored at memory address "1000" would be the next instruction to fetch if either the instruction stored at memory address "0996" was the preceding instruction or if some other branch instruction jumped to memory address "1000." The memory address "1000" is applied to the CAM fields of both BLAC 40 and BTAC 42 for a possible match. By construction, data processor 10 has recently come out of a reset condition. Therefore, BLAC 40, BTAC 42, and latch 48 are empty or only contain "invalid" entries. The CAM cells within BLAC 40 and BTAC 42 both generate a MISS signal. (Data processor 10 applies the contents of the instruction pointer to BLAC 40 and BTAC 42 for each instruction or group of instructions that it processes. For purposes of clarity, these compare steps will be omitted except in those cases in which they aid in the teaching of the invention.)

Figure 6:
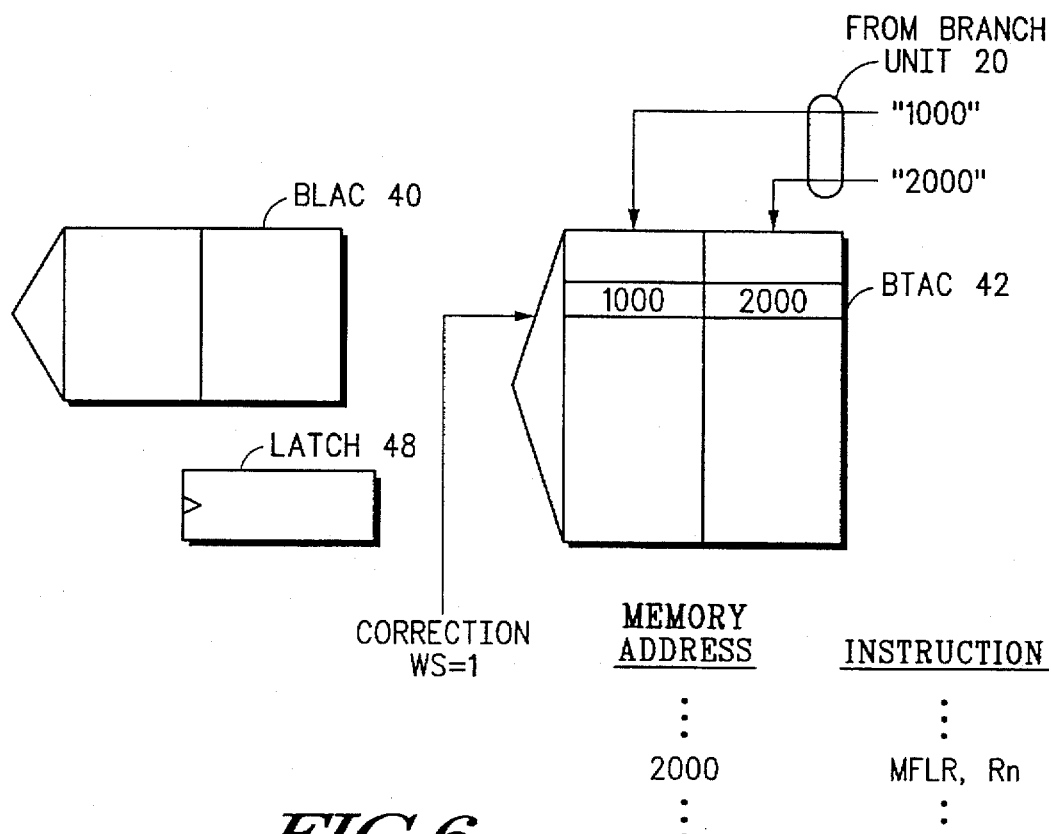

In FIG. 6, sequencer unit 18 updates the contents of BTAC 42 to reflect the prior miss-predicted branch from FIG. 5. As described above, BLAC/BTAC control logic unit 44 asserts the control signal CORRECTION WS contemporaneous with branch unit 20 providing a BFA-CORRECTION input and a BTA-CORRECTION input. These addresses are thereby written into a selected entry of BTAC 42. In the depicted embodiment, this update operation occurs during the completion phase of the branch and link instruction depicted in FIG. 5. Later, data processor 10 executes the first instruction of subroutine 52, a move from link register instruction ("MFLR"). This instruction saves the return address in register Rn of GPR file 32. This storing step guarantees the integrity of the return address in case subroutine 52 calls a second subroutine. Data processor 10 continues executing instructions in subroutine 52.

Figure 7:
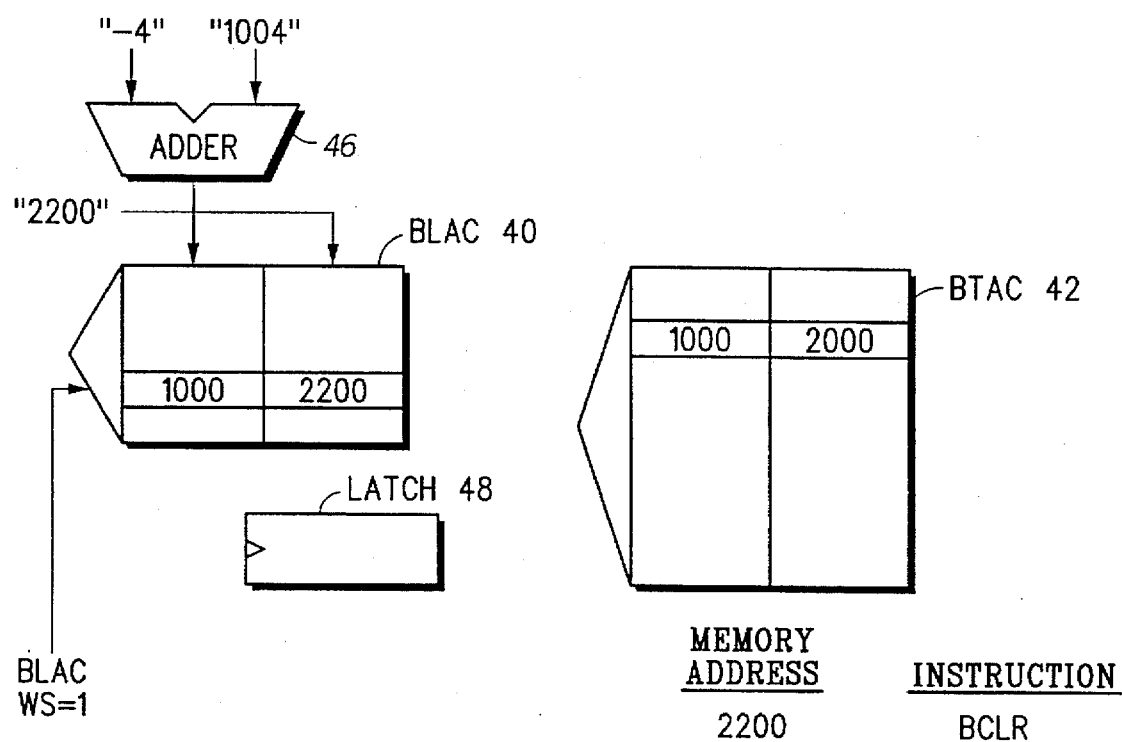

In FIG. 7, data processor 10 executes the branch to link register instruction ("BCLR") at the end of subroutine 52 for the first time. As described above, BLAC/BTAC control logic unit 44 asserts the control signal BLAC WS when it encounters a BCLR instruction. BLAC 40 stores the output of adder 46 and the current instruction pointer into the CAM field and into the RAM field, respectively, of a selected entry once the contents of link register 37 are valid. In this case, the output of adder 46 equals "1000" (−4+1004) and the current instruction pointer is "2200."

Figure 8:
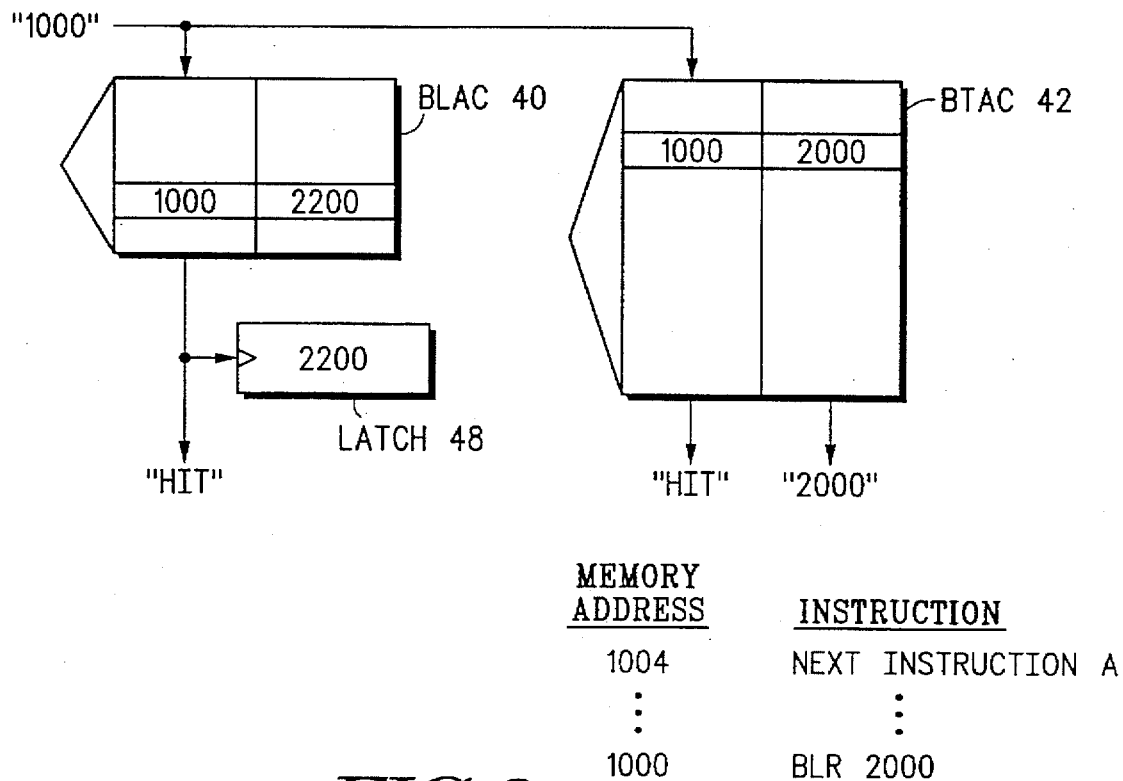

In FIG. 8, data processor 10 returns from subroutine 52, executing the instruction following the previous call instruction, NEXT INSTRUCTION A. (It should be noted that without the disclosed invention or before the disclosed invention is completely operational, there will be a delay between the branch to link register instruction and the NEXT INSTRUCTION A. The previous instruction, 2196 MTLR Rn, must load the contents of link register 37 with the contents of register Rn before data processor 10 can branch to the appropriate address.) Data processor 10 continues executing instructions, eventually returning to the branch and link instruction stored at memory address 1000. The CAM cells within BLAC 40 and BTAC 42 both generate a HIT signal when presented with an instruction pointer equal to "1000." Latch 48 samples and holds the EOS field ("2200") associated with the matching CALL ADDRESS. BTAC 42 outputs the BRANCH TARGET ADDRESS ("2000") associated with the matching BRANCH FETCH ADDRESS. As described above, data processor 10 branches to the instruction stored at memory address "2000" before processing the branch and link instruction any further.

Figure 9:
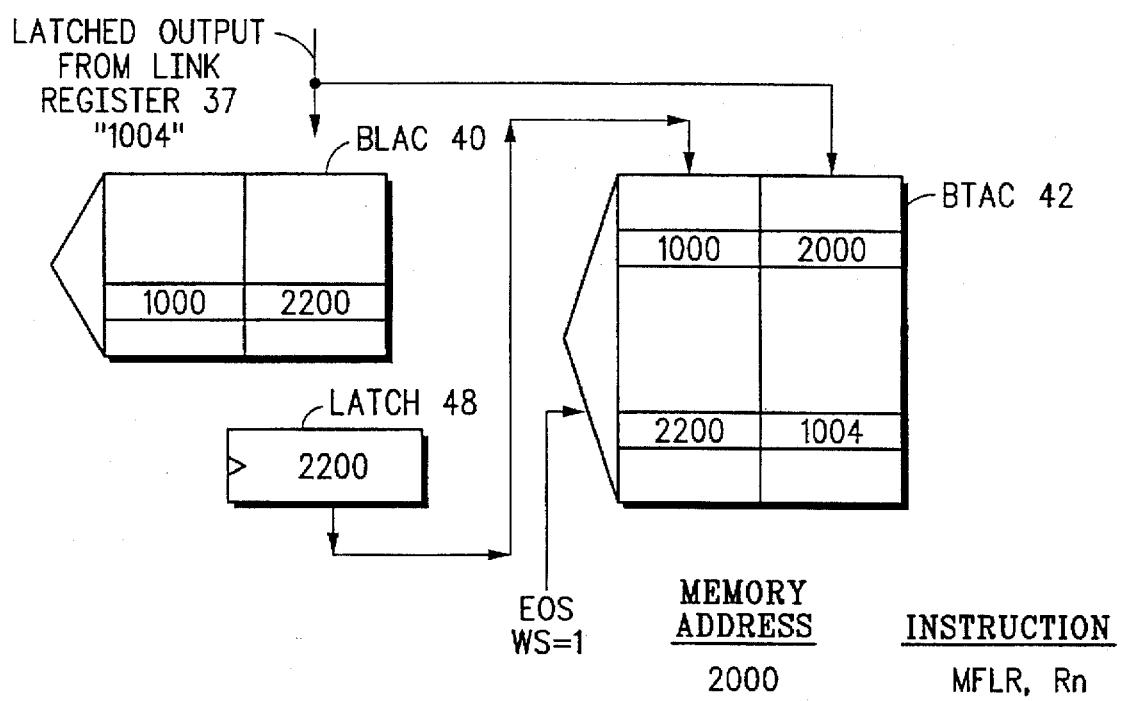

In FIG. 9, BLAC/BTAC control logic unit 44 enables BTAC 42 to predict the target address of the upcoming branch to link instruction. As described above, BLAC/BTAC control logic unit 44 asserts the control signal EOS WS after a hit in BLAC 40. BTAC 42 stores the output of latch 48 and the latched output of link register 37, "1004," into a selected entry of BTAC 42. Data processor 10 continues executing instructions in subroutine 52.

Figure 10:
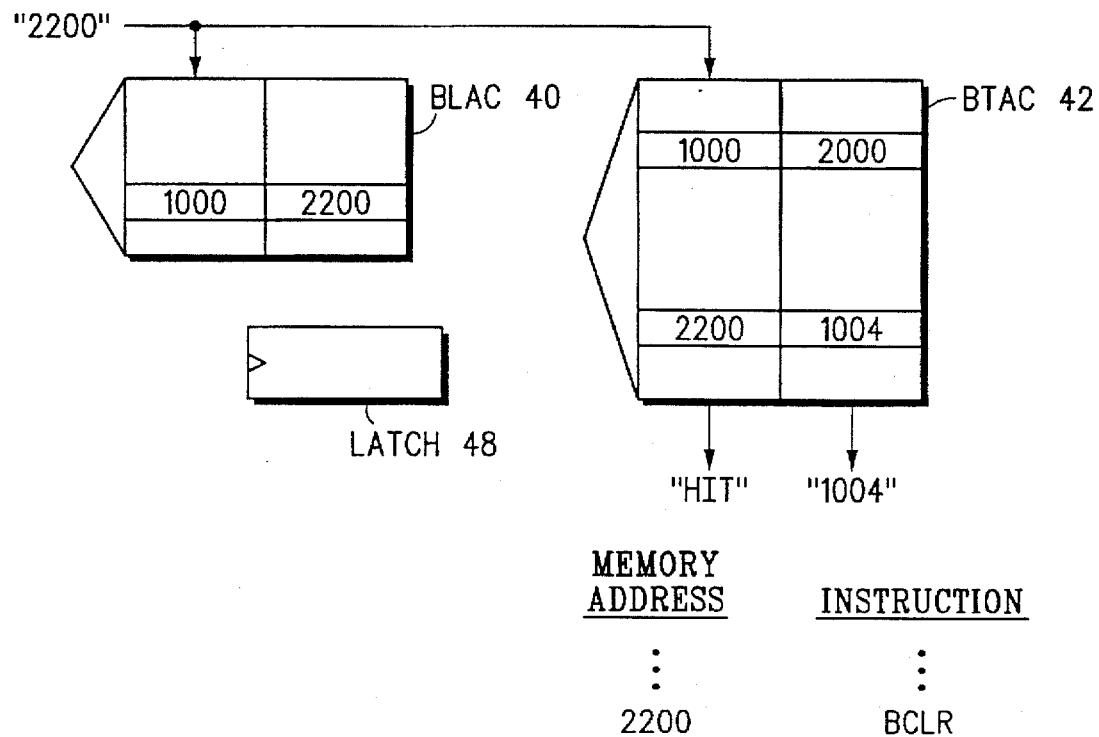

In FIG. 10, data processor 10 executes the branch to link register instruction ("BCLR") at the end of subroutine 52 for the second time. Now, the instruction pointer "hits" in BTAC 42, outputting the TARGET FETCH ADDRESS, "1004." Therefore, data processor 10 branches to the instruction stored at memory address "1004" before processing the branch to link register instruction any further or before the previous MTLR instruction has executed fully.. This branch prediction methodology ensures that data processor 10 has a steady supply of instructions to process.

Figure 11:
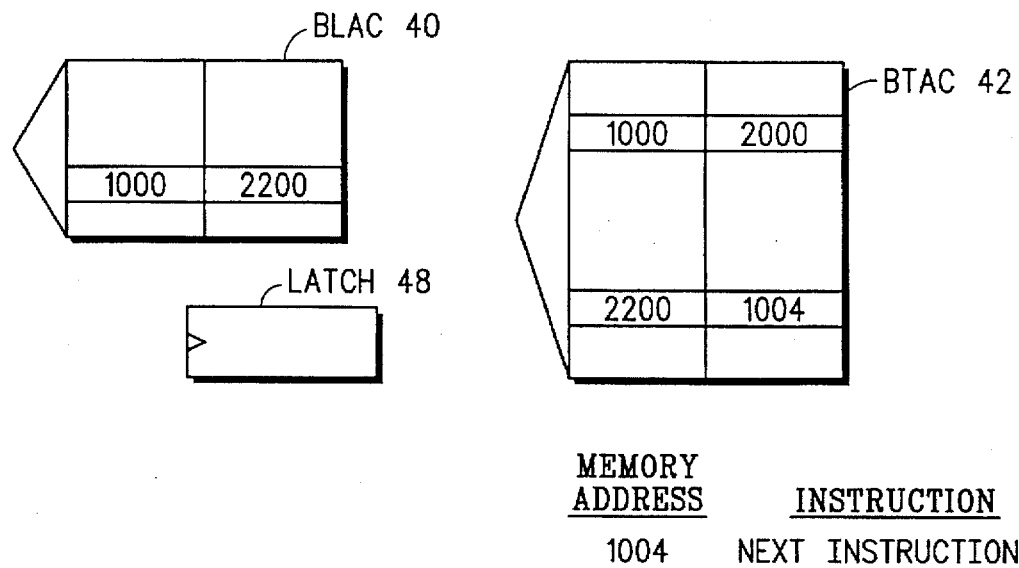

In FIG. 11, data processor 10 returns from subroutine 52, executing the instruction following the previous call instruction, NEXT INSTRUCTION A.

Figure 12:
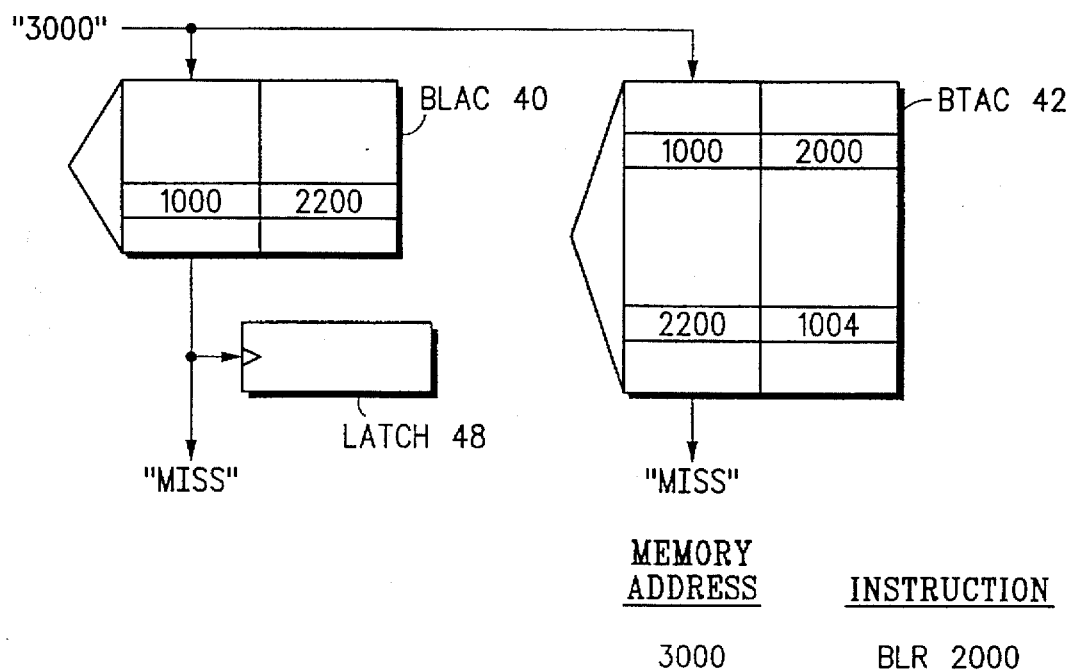

In FIG. 12, the instruction pointer (not shown) of data processor 10 determines that the branch and link instruction stored at memory address "3000" is the next instruction to fetch and begin processing. The memory address "3000" is applied to the CAM fields of both BLAC 40 and BTAC 42 for a possible match. The CAM cells within BLAC 40 and BTAC 42 both generate a MISS signal.

Figure 13:
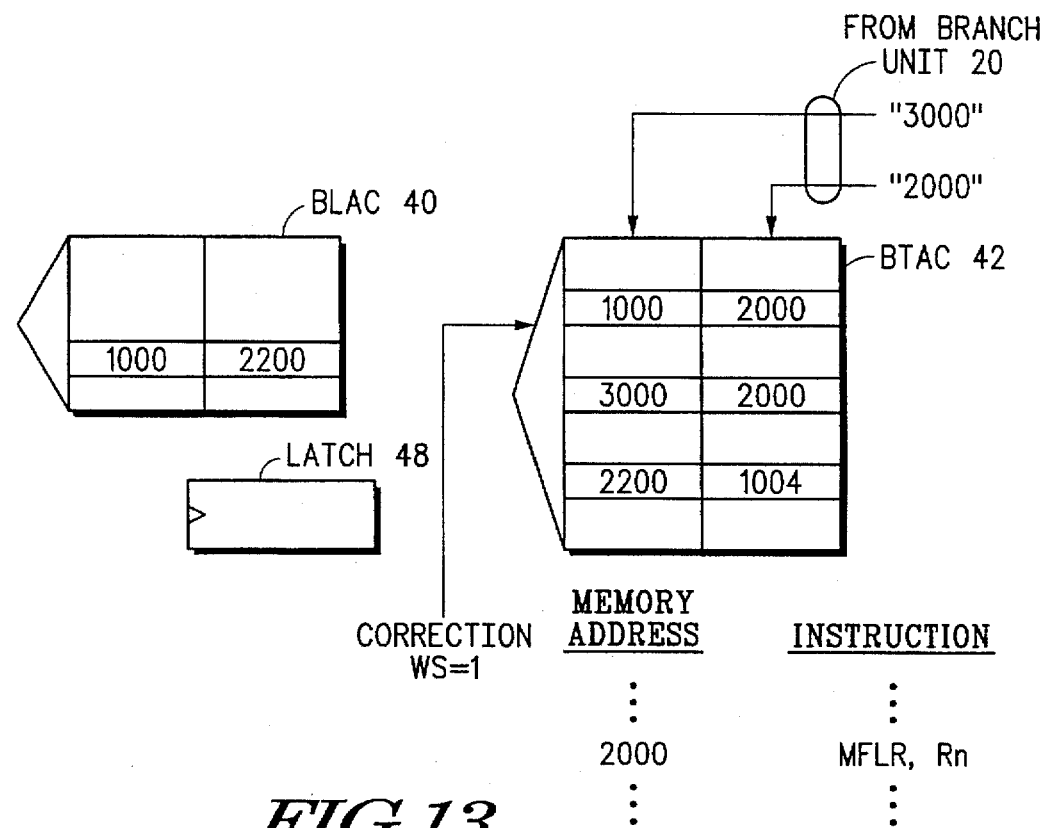

In FIG. 13, sequencer unit 18 updates the contents of BTAC 42 to reflect the prior miss-predicted branch from FIG. 12. Later, data processor 10 executes the first instruction of subroutine 52, a move from link register instruction ("MFLR"). Data processor 10 continues executing instructions in subroutine 52.

Figure 14:
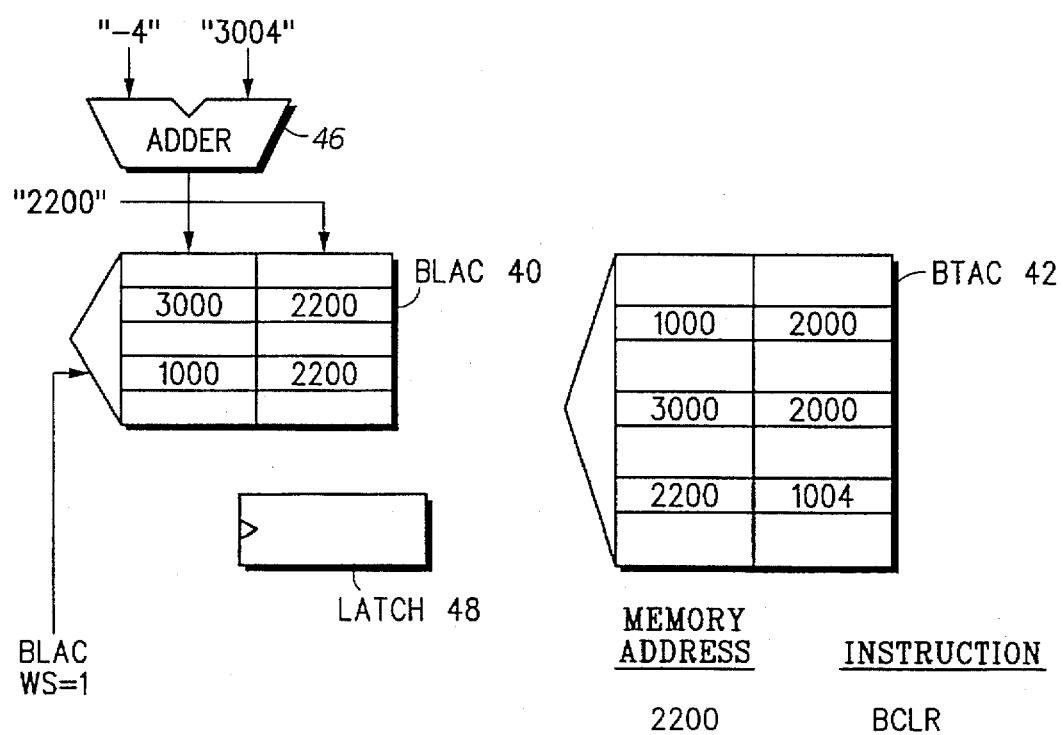

In FIG. 14, data processor 10 executes the branch to link register instruction ("BCLR") at the end of subroutine 52 for the third time. (Although not depicted, BTAC 42 will miss-predict that fetch address "2200" branches to target address "1004.") As described above, BLAC/BTAC control logic unit 44 asserts the control signal BLAC WS when it encounters a BCLR instruction. BLAC 40 stores the output of adder 46 and the current instruction pointer into the CAM field and into the RAM field, respectively, of a selected entry once the contents of link register 37 are valid. In this case, the output of adder 46 equals "3000" (−4+3004) and the current instruction pointer is "2200."

Figure 15:
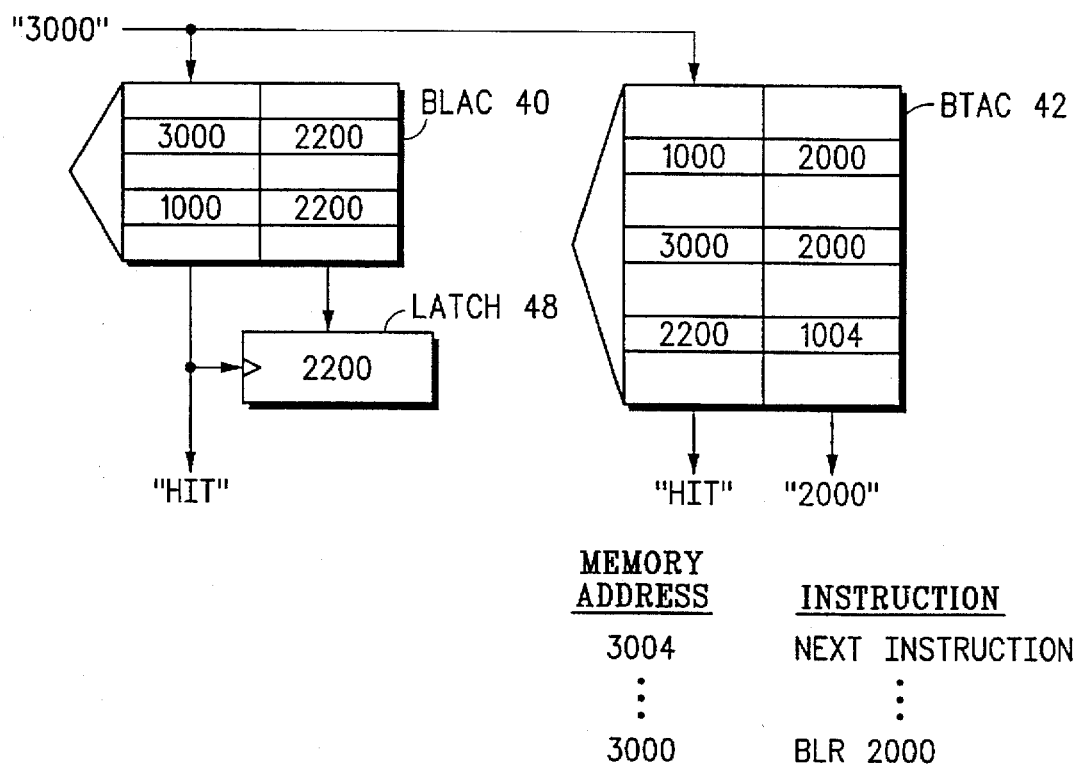

In FIG. 15, data processor 10 returns from subroutine 52, executing the instruction following the previous call instruction, NEXT INSTRUCTION B. (It should be noted that without the disclosed invention or before the disclosed invention is completely operational, there will be delay between the branch to link register instruction and the NEXT INSTRUCTION B.) Data processor 10 continues executing instructions, eventually returning to the branch and link instruction stored at memory address 3000. The CAM cells within BLAC 40 and BTAC 42 both generate a HIT signal when presented with an instruction pointer equal to "1000." Latch 48 samples and holds the EOS field ("2200") associated with the matching CALL ADDRESS. BTAC 42 outputs the BRANCH TARGET ADDRESS ("2000") associated with the matching BRANCH FETCH ADDRESS. As described above, data processor 10 branches to the instruction stored at memory address "2000" before processing the branch and link instruction any further.

Figure 16:
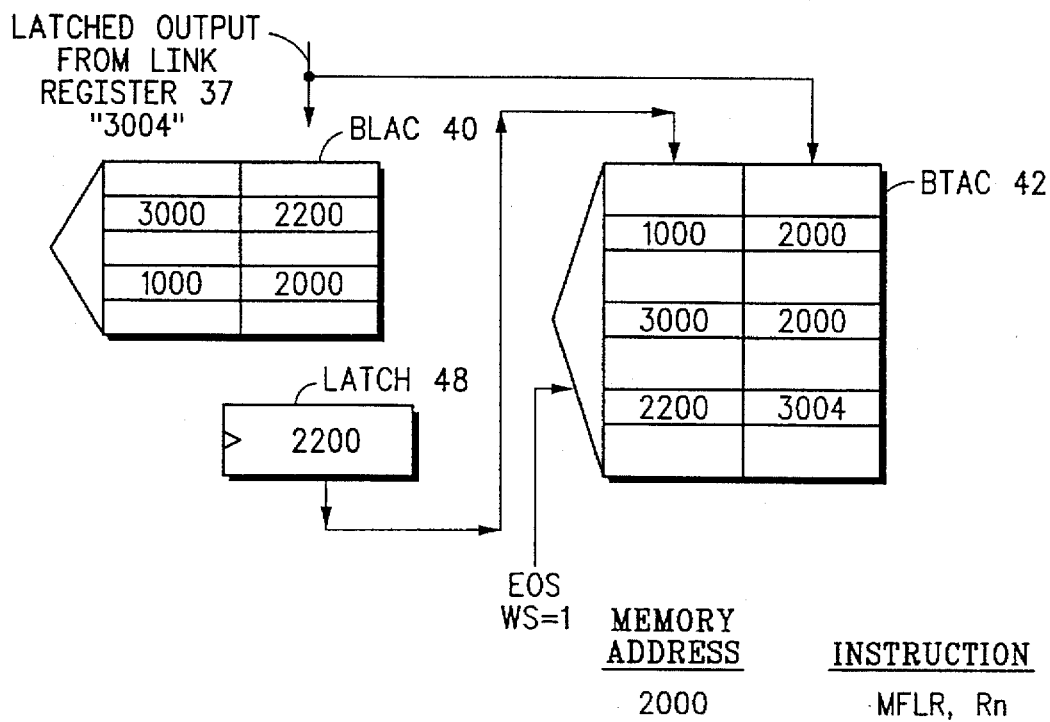

In FIG. 16, BLAC/BTAC control logic unit 44 enables BTAC 42 to predict the target address of the upcoming branch to link instruction. As described above, BLAC/BTAC control logic unit 44 asserts the control signal EOS WS after a hit in BLAC 40. BTAC 42 stores the output of latch 48 and the latched output of link register 37, "3004," into a selected entry of BTAC 42. BTAC 42 selects the entry whose CAM field matches the supplied EOS address field to avoid aliasing problems. Data processor 10 continues executing instructions in subroutine 52.

Figure 17:
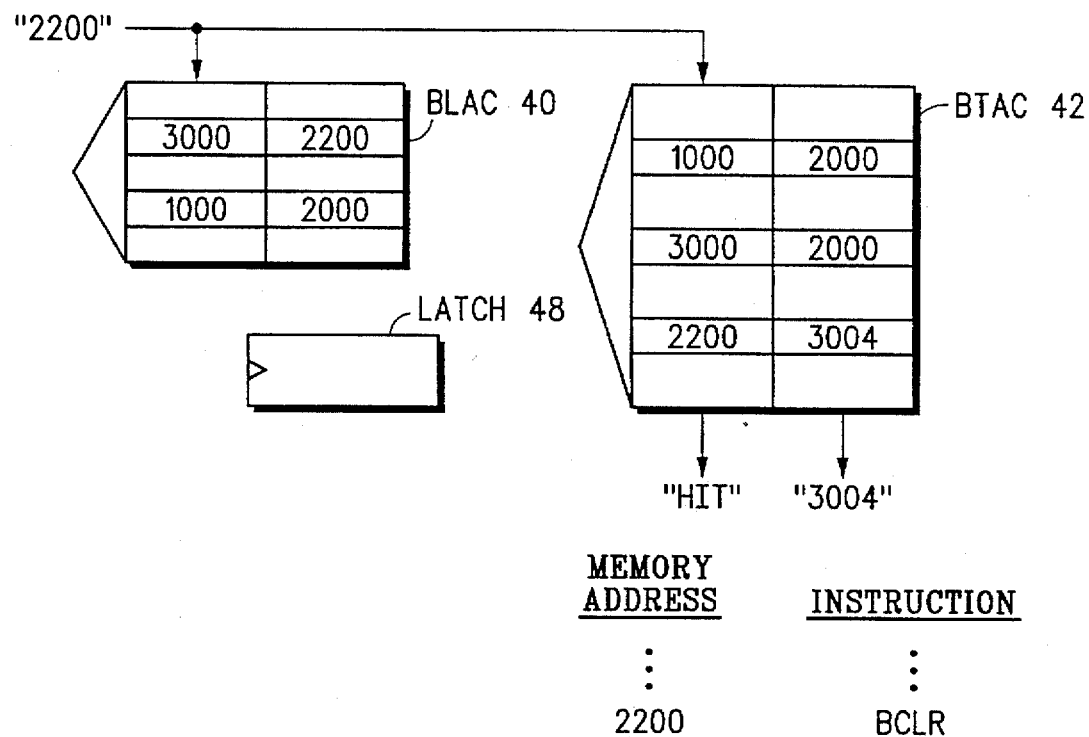

In FIG. 17, data processor 10 executes the branch to link register instruction ("BCLR") at the end of subroutine 52 for the fourth time. Now, the instruction pointer "hits" in BTAC 42, outputting the TARGET FETCH ADDRESS, "3004." Therefore, data processor 10 branches to the instruction stored at memory address "3004" before processing the branch to link register instruction any further. This branch prediction methodology ensures that data processor 10 has a steady supply of instructions to process.

Figure 18:
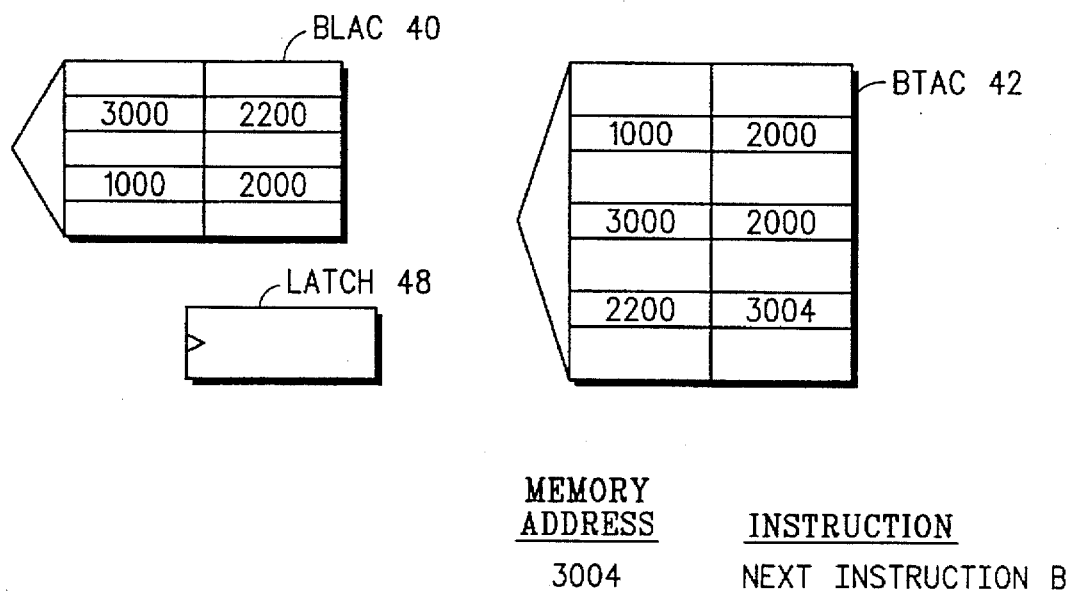

In FIG. 18, data processor 10 returns from subroutine 52, executing the instruction following the previous call instruction, NEXT INSTRUCTION B.

Figure 19:
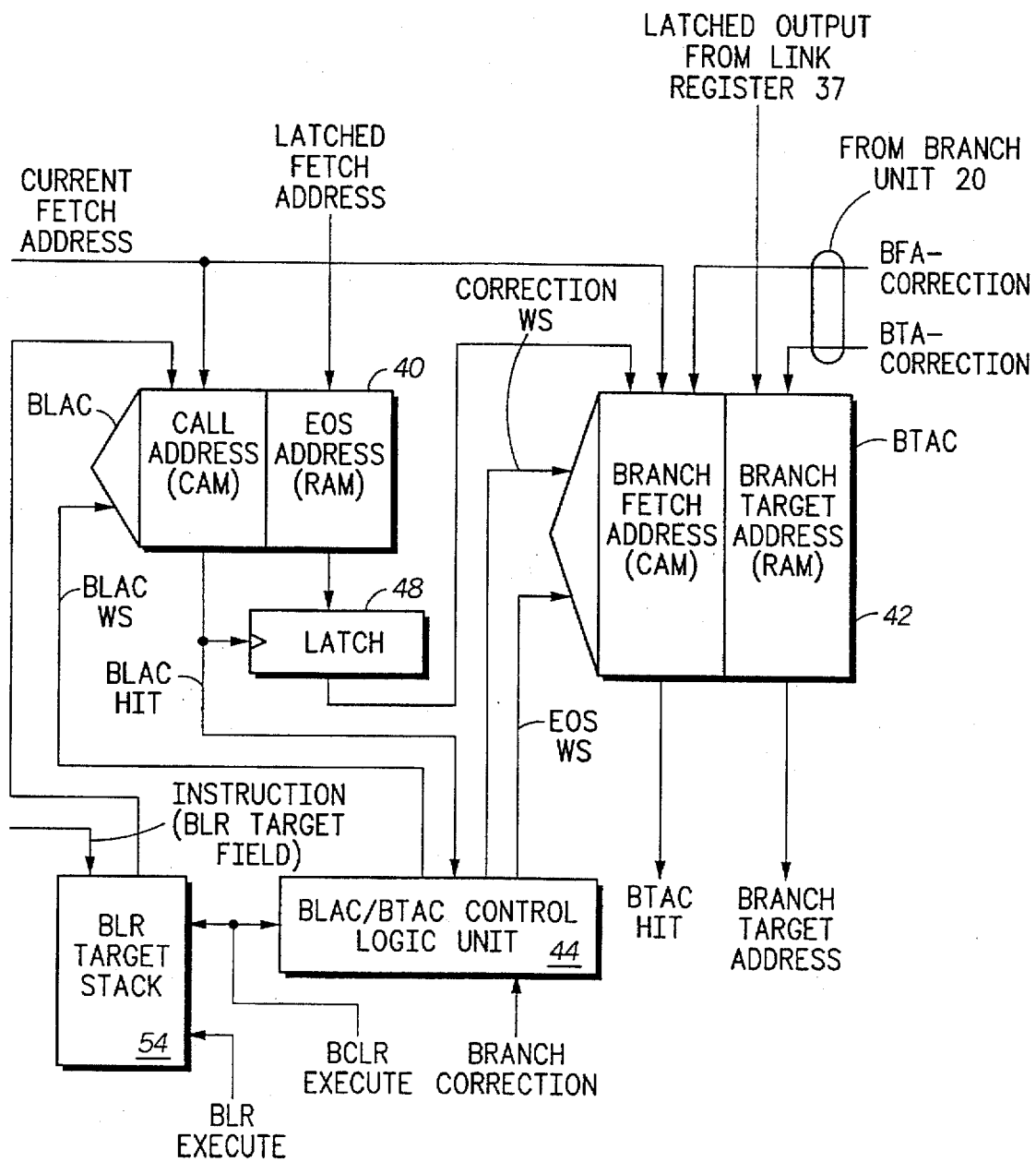
FIG. 19 depicts a block diagram of a second embodiment of a portion of the sequencer unit depicted in FIG. 1.

FIG. 19 depicts a block diagram of a second embodiment of a portion of sequencer unit 18 depicted in FIG. 1. FIG. 19 primarily depicts the circuits related to the fetch cycle operations of sequencer unit 18. In particular, the fetch cycle portion of sequencer unit 18 has a BLAC 40, a BTAC 42, a BLAC/BTAC control logic trait 44, a latch 48, and a BLR target stack 54. BLAC 40, BTAC 42, BLAC/BTAC control logic unit 44, and latch 48 are similar to the structures described above in connection with FIG. 4. (Adder 46 is omitted.) Therefore, the following description will highlight the differences between the first embodiment depicted in FIG. 4 and the second embodiment depicted in FIG. 19.

The thirty EOS ADDRESS bits of BLAC 40 are also stored in thirty random access memory ("RAM") cells. However, the write port of the RAM cells receives the fetch address described above delayed one cycle: a "latched fetch address."

BLR target stack 54 is a last-in-first-out ("LIFO") queue that stores the BLR target field of each executed branch and link instruction. (In the examples described in connection with FIGS. 5 through 18, "2000" was the BLR target field of each BLR instruction.) BLR target stack 54 can simultaneously buffer up to P nested subroutine target fields, where P is the depth of the stack. In the depicted embodiment, P equals eight. BLR target stack 54 "pushes" a new entry onto the top of its stack when sequencer unit 18 asserts a control signal BLR EXECUTE. Conversely, BLR target stack 54 "pops" an entry off of the top of its stack when sequencer unit 18 asserts BCLR EXECUTE. The decode portion of sequencer unit 18 asserts the control signal BLR EXECUTE when it decodes a branch and link instruction (subroutine call) in the instruction stream. The output of BLR target stack is connected to a write port of the CAM cells of BLAC 40 in place of the output of adder 46.

FIGS. 20 through 33 illustrate the operation of the second embodiment of the disclosed invention depicted in FIG. 19. In particular, data processor 10 executes subroutine 52, depicted in FIG. 4, three times. First, dam processor 10 calls subroutine 52 two times from the BLR instruction stored at memory address 1000. These subroutine calls are depicted in FIG.s 20 through 28. Second, data processor 10 calls subroutine 52 once from the BLR instruction stored at memory address 3000. This subroutine call is depicted in FIGS. 29 through 33.

Figure 20:
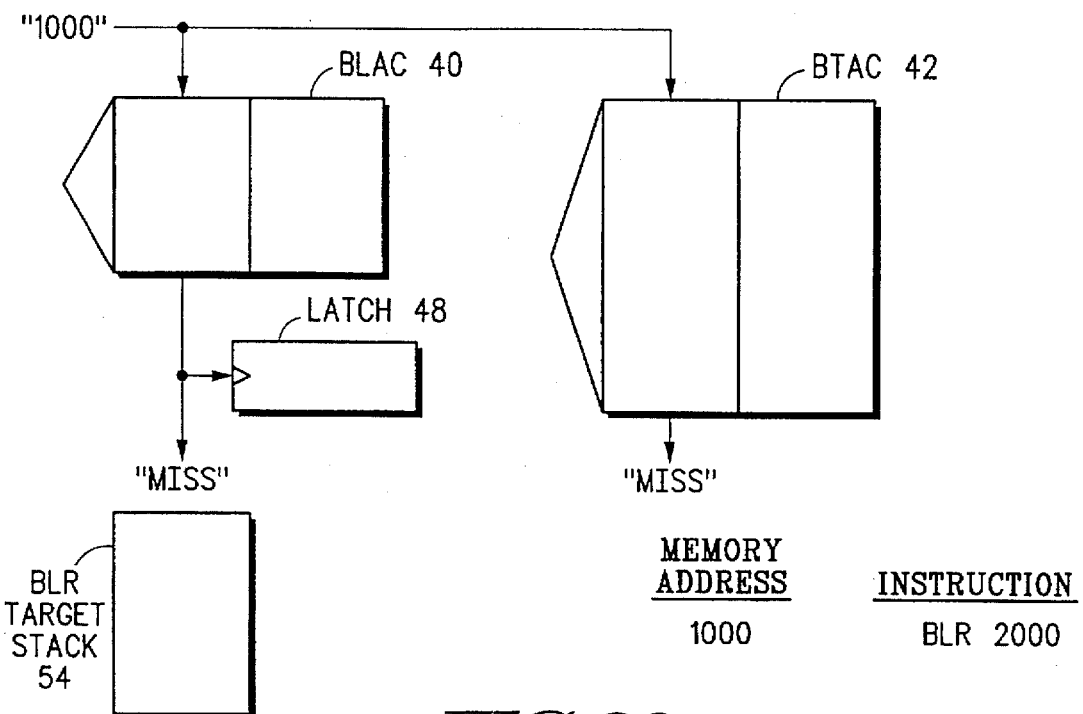
FIGS. 20 through 33 illustrate the operation of the second embodiment of the disclosed invention depicted in FIG. 19.

Continuing with FIG. 20, the instruction pointer (not shown) of data processor 10 determines that the branch and link instruction stored at memory address "1000" is the next instruction to fetch and begin processing. By construction, data processor 10 has recently come out of a reset condition. Therefore, BLAC 40, BTAC 42, and latch 48 are empty or only contain "invalid" entries. The CAM cells within BLAC 40 and BTAC 42 both generate a MISS signal. (Data processor 10 applies the contents of the instruction pointer to BLAC 40 and BTAC 42 for each instruction or group of instructions that it processes. For purposes of clarity, these compare steps will be omitted except in those cases in which they aid in the teaching of the invention.)

Figure 21:
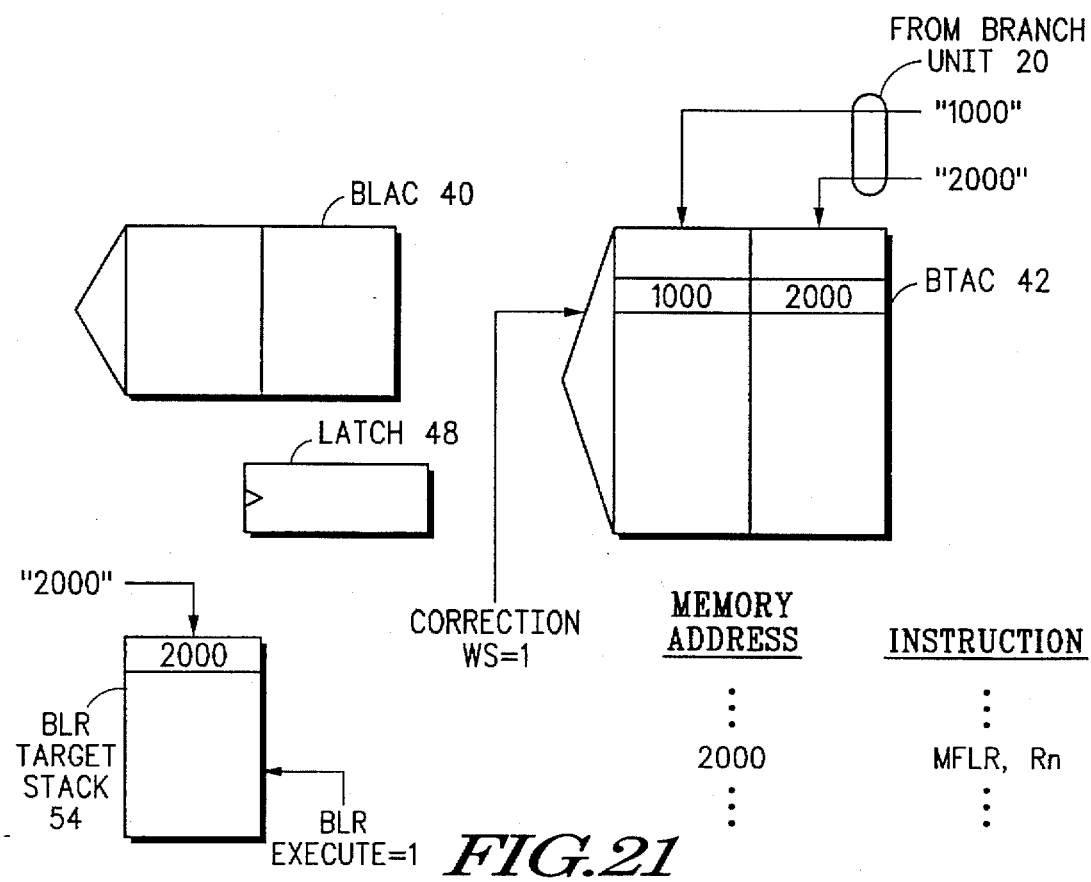

In FIG. 21, sequencer unit 18 determines that the instruction stored in memory address 1000 is a branch and link instruction. Therefore, sequencer unit 18 asserts BLR EXECUTE, pushing the BLR target field of the branch and link instruction into BLR target stack 54. In the depicted embodiment, this "push" occurs during the execute phase of the branch and link instruction. Sequencer unit 18 also updates the contents of BTAC 42 to reflect the prior miss-predicted branch from FIG. 20. As described above, BLAC/BTAC control logic unit 44 asserts the control signal CORRECTION WS contemporaneous with branch unit 20 providing a BFA-CORRECTION input and a BTA-CORRECTION input. These addresses are thereby written into a selected entry of BTAC 42. In the depicted embodiment, this update operation occurs during the completion phase of the branch and link instruction depicted in FIG. 20. Later, data processor 10 executes the first instruction of subroutine 52, a move from link register instruction ("MFLR"). This instruction saves the return address in register Rn of GPR file 32. This storing step guarantees the integrity of the return address in case subroutine 52 calls a second subroutine. Data processor 10 continues executing instructions in subroutine 52.

Figure 22:
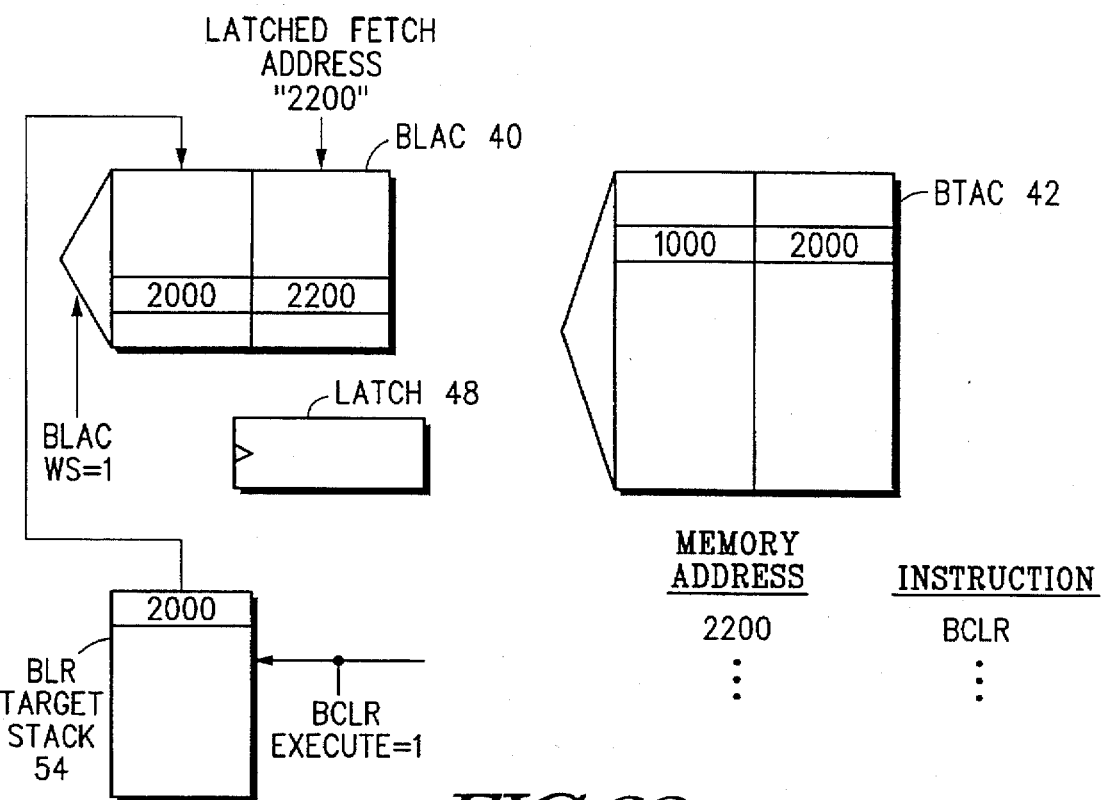

In FIG. 22, data processor 10 executes the branch to link register instruction ("BCLR") at the end of subroutine 52 for the first time. As described above, BLAC/BTAC control logic unit 44 asserts the control signal BLAC WS when it executes a BCLR instruction. BLAC 40 stores the output of BLR target stack 54 and the latched fetch address into the CAM field and into the RAM field, respectively, of a selected entry. Sequencer unit 18 also asserts BCLR EXECUTE causing BLR target stack 54 to "pop off" its newest entry.

Figure 23:
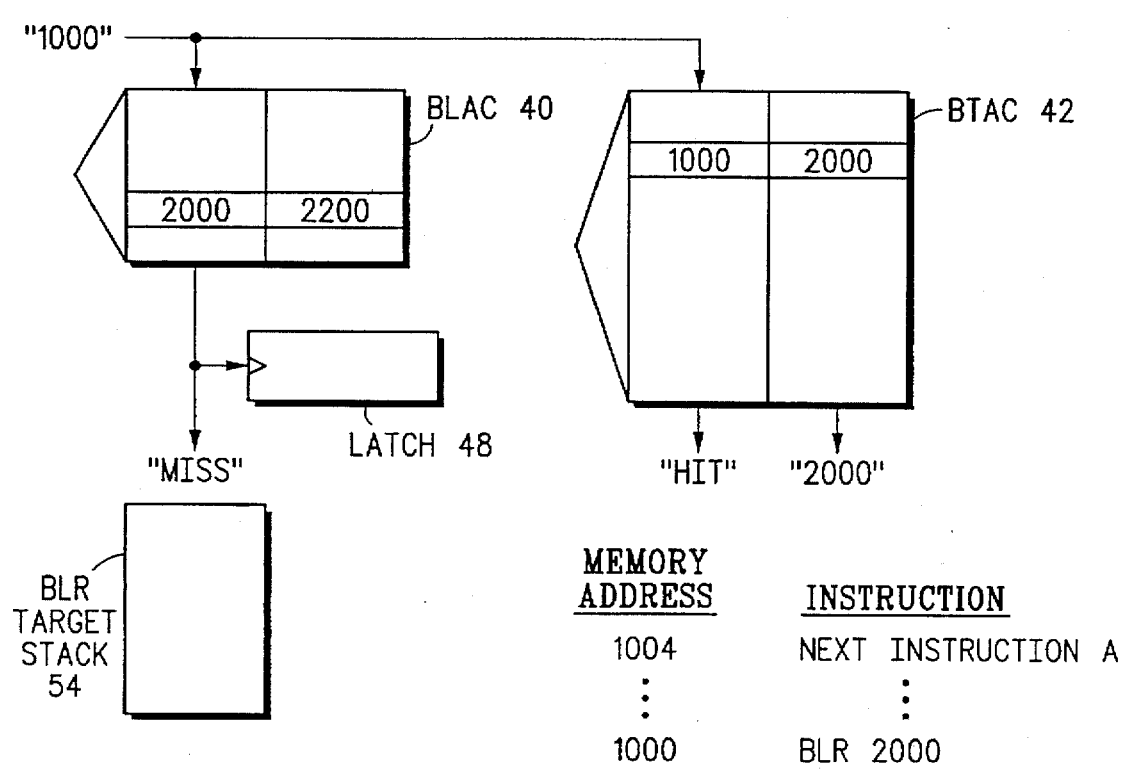

In FIG. 23, data processor 10 returns from subroutine 52, executing the instruction following the previous call instruction, NEXT INSTRUCTION A. (It should be noted that without the disclosed invention or before the disclosed invention is completely operational, there will be delay between the branch to link register instruction and NEXT INSTRUCTION A. The previous instruction, 2196 MTLR Rn, must load the contents of link register 37 with the contents of register Rn before data processor 10 can branch to the appropriate address.) Data processor 10 continues executing instructions, eventually returning to the branch and link instruction stored at memory address 1000. The CAM cells within BLAC 40 generate a MISS signal when presented with an instruction pointer equal to "1000." The CAM cells within BTAC 42 generate a HIT signal when presented with an instruction pointer equal to "1000." BTAC 42 outputs the BRANCH TARGET ADDRESS ("2000") associated with the matching BRANCH FETCH ADDRESS. As described above, data processor 10 branches to the instruction stored at memory address "2000" before processing the branch and link instruction any further.

Figure 24:
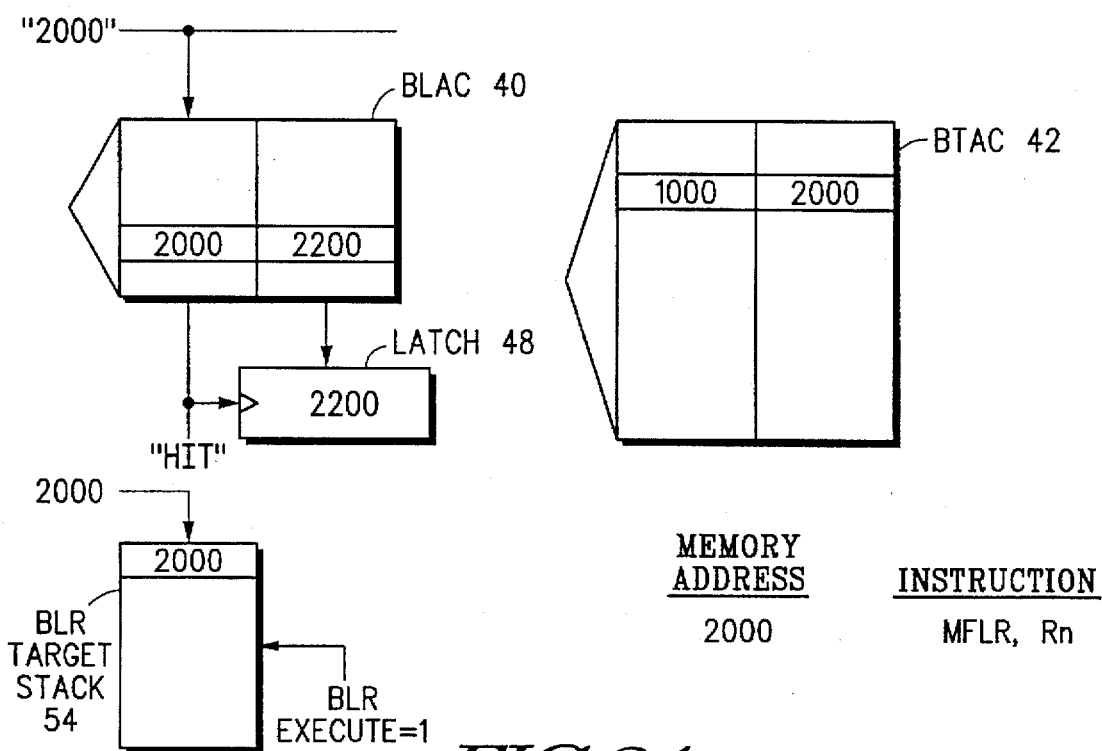

In FIG. 24, data processor 10 begins processing the first instruction of subroutine 52. The CAM cells within BLAC 40 generate a HIT signal when presented with the address of the move from link register instruction. Therefore, latch 48 samples and holds the EOS field ("2200") associated with the matching CALL ADDRESS. Later, when data processor 10 executes the branch and link instruction depicted in FIG. 23, BLR target stack 54 pushes the BLR target field onto the stack.

Figure 25:
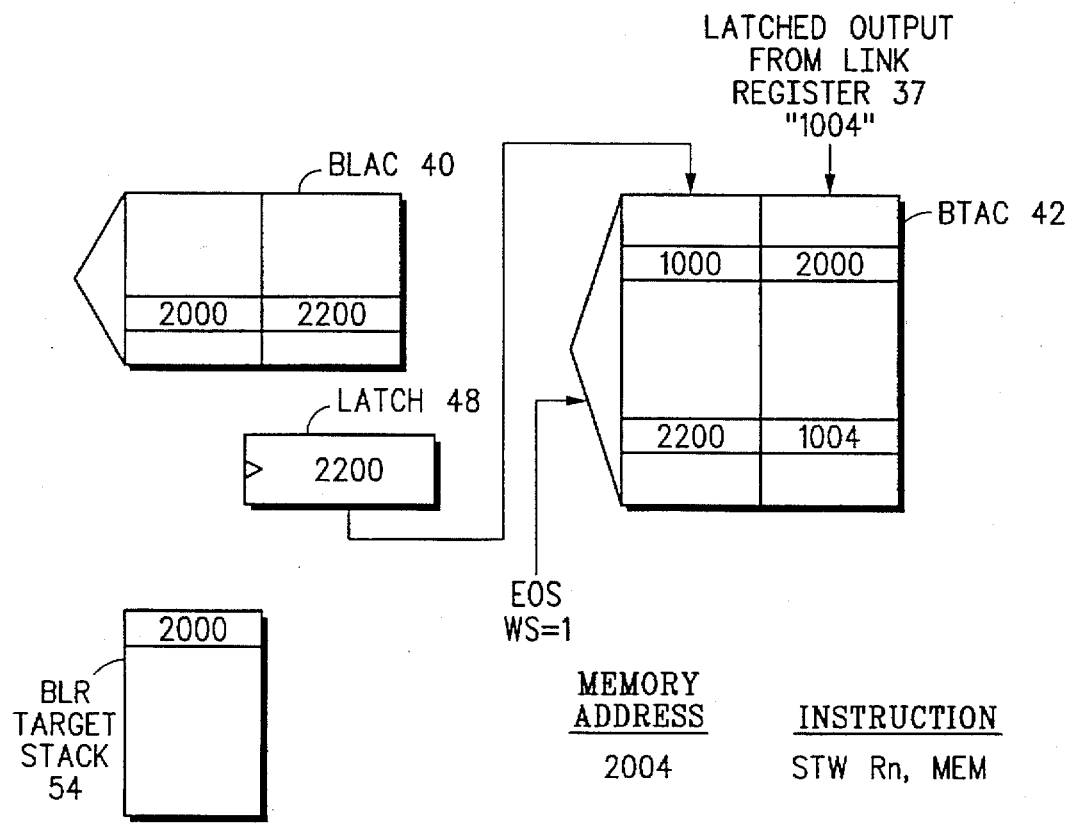

In FIG. 25, data processor 10 begins processing the second instruction of subroutine 52, a store instruction ("STW"). As described above, BLAC/BTAC control logic unit 44 asserts EOS WS the cycle following a BLAC "hit." BTAC 42 stores the output of latch 48 and the latched output of link register 37, "1004," into a selected entry of BTAC 42.

Figure 26:
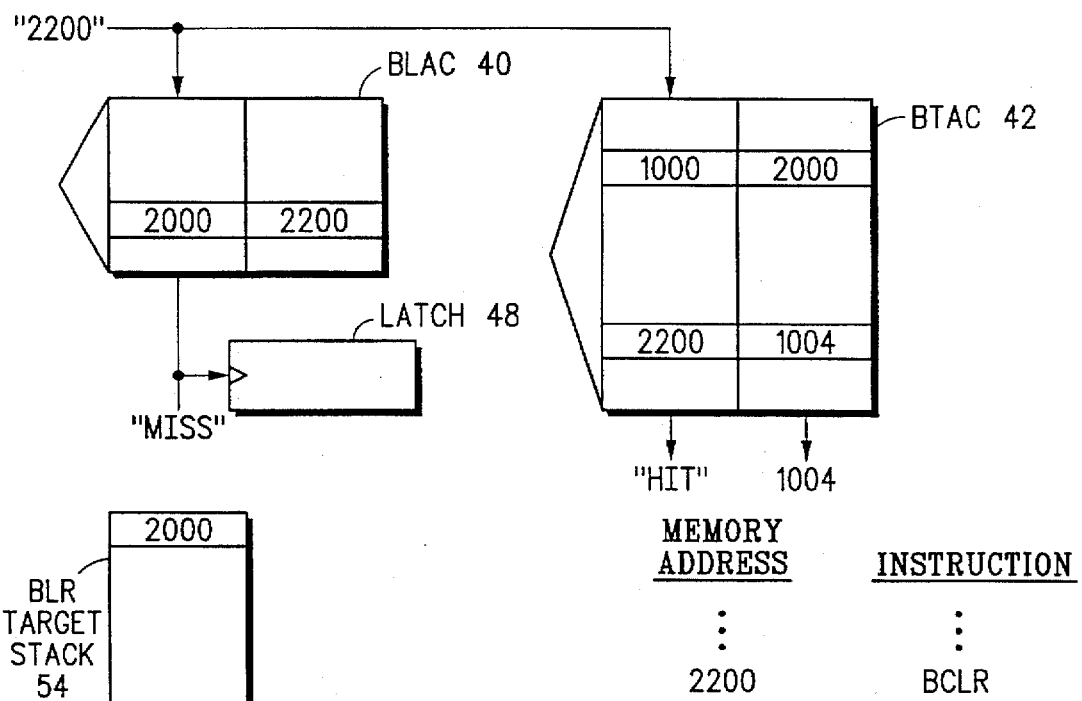

In FIG. 26, data processor 10 executes the branch to link register instruction ("BCLR") at the end of subroutine 52 for the second time. Now, the instruction pointer "hits" in BTAC 42, outputting the TARGET FETCH ADDRESS, "1004." Therefore, data processor 10 branches to the instruction stored at memory address "1004" before processing the branch to link register instruction any further. This branch prediction methodology ensures that data processor 10 has a steady supply of instructions to process.

Figure 27:
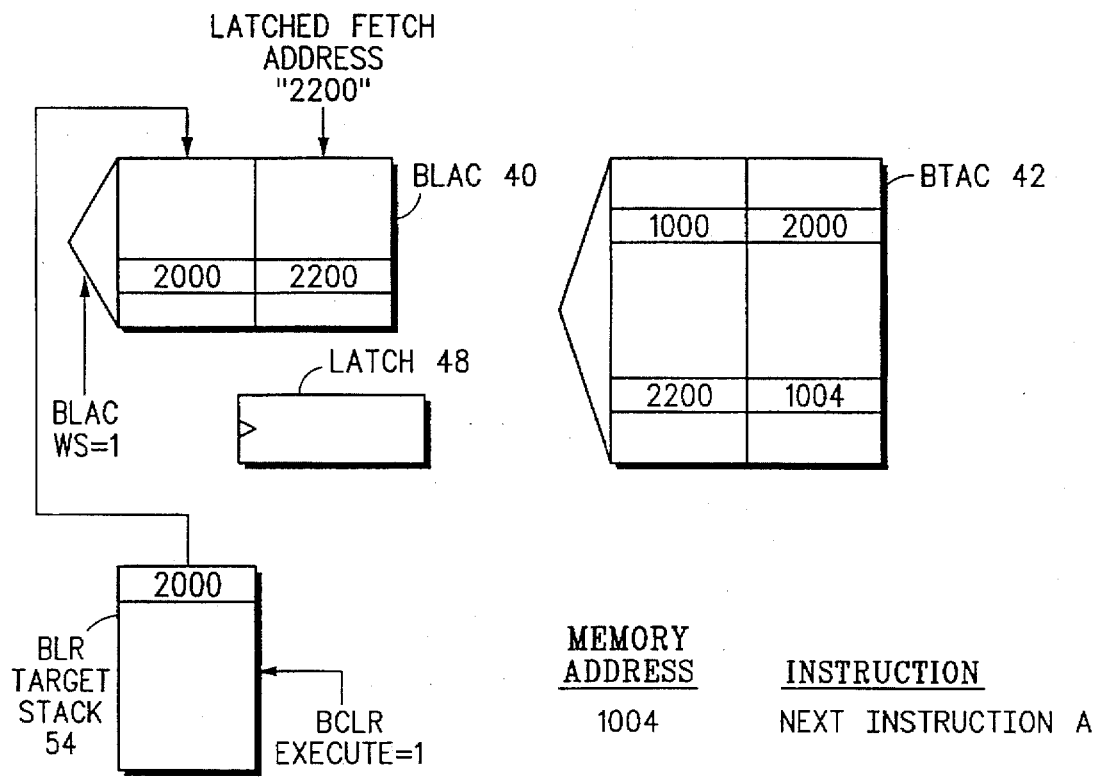

In FIG. 27, data processor 10 returns from subroutine 52, executing the instruction following the previous call instruction, NEXT INSTRUCTION A. Later, when data processor 10 reaches the execute phase of the branch to link register instruction depicted in FIG. 26, BLAC/BTAC control logic unit 44 asserts the control signal BLAC WS. BLAC 40 stores the output of BLR target stack 54 and the latched fetch address into the CAM field and into the RAM field, respectively, of a selected entry. Sequencer unit 18 also asserts BCLR EXECUTE causing BLR target stack 54 to "pop off" its newest entry.

Figure 28:
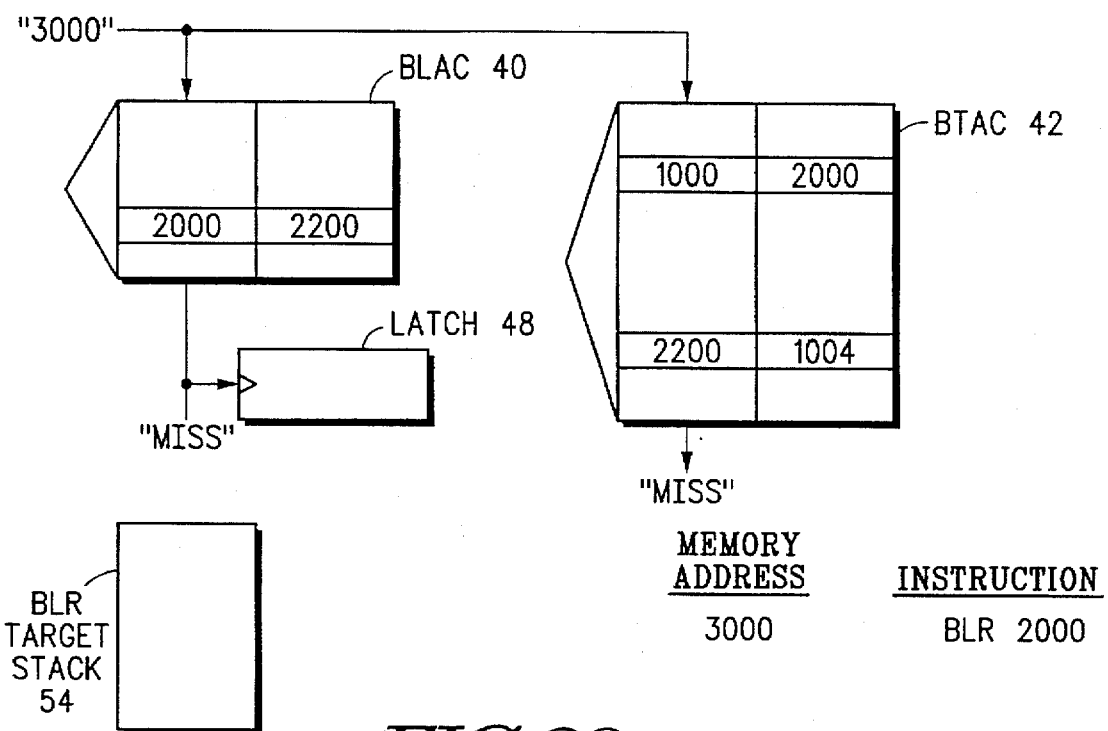

In FIG. 28, the instruction pointer (not shown) of data processor 10 determines that the branch and link instruction stored at memory address "3000" is the next instruction to fetch and begin processing. The memory address "3000" is applied to the CAM fields of both BLAC 40 and BTAC 42 for a possible match. The CAM cells within BLAC 40 and BTAC 42 both generate a MISS signal.

Figure 29:
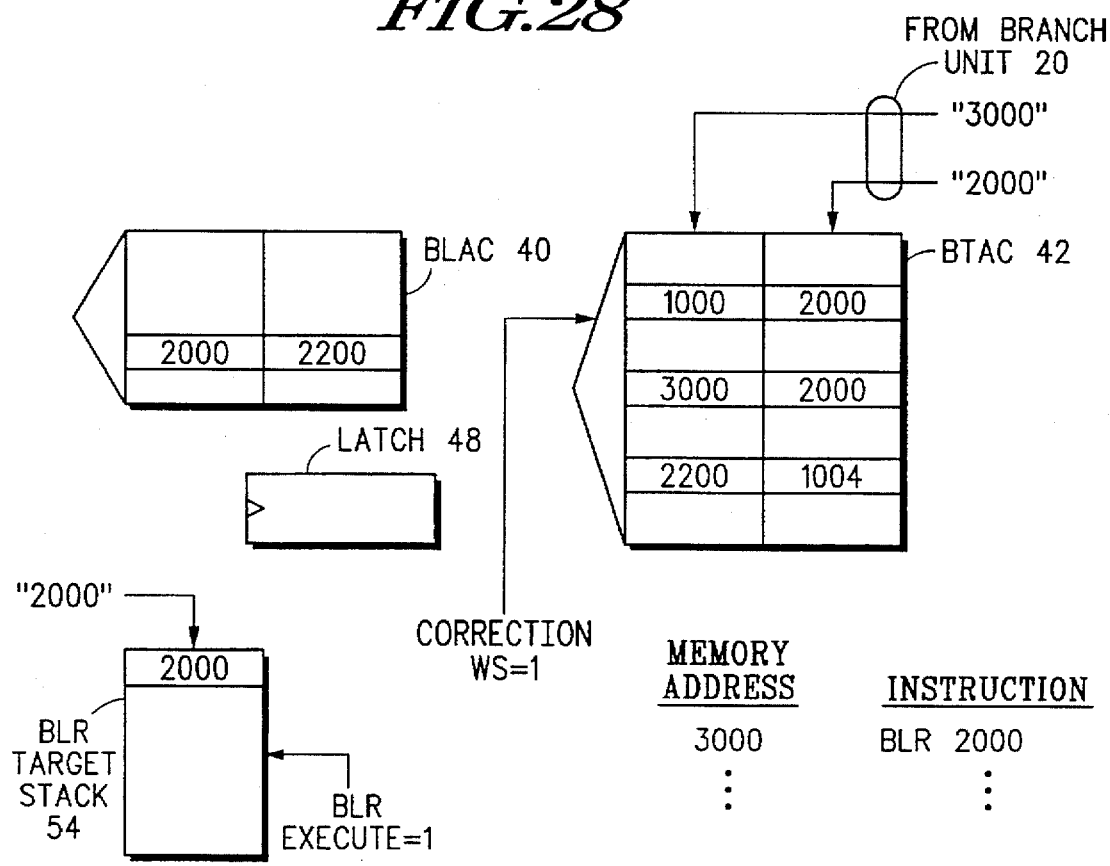

In FIG. 29, sequencer unit 18 continues processing the instruction fetched in FIG. 28, determining that the instruction is a branch and link instruction. Therefore, sequencer unit 18 asserts BLR EXECUTE, pushing the BLR target field of the branch and link instruction into BLR target stack 54. Sequencer unit 18 updates the contents of BTAC 42 to reflect the prior miss-predicted branch from FIG. 28.

Figure 30:
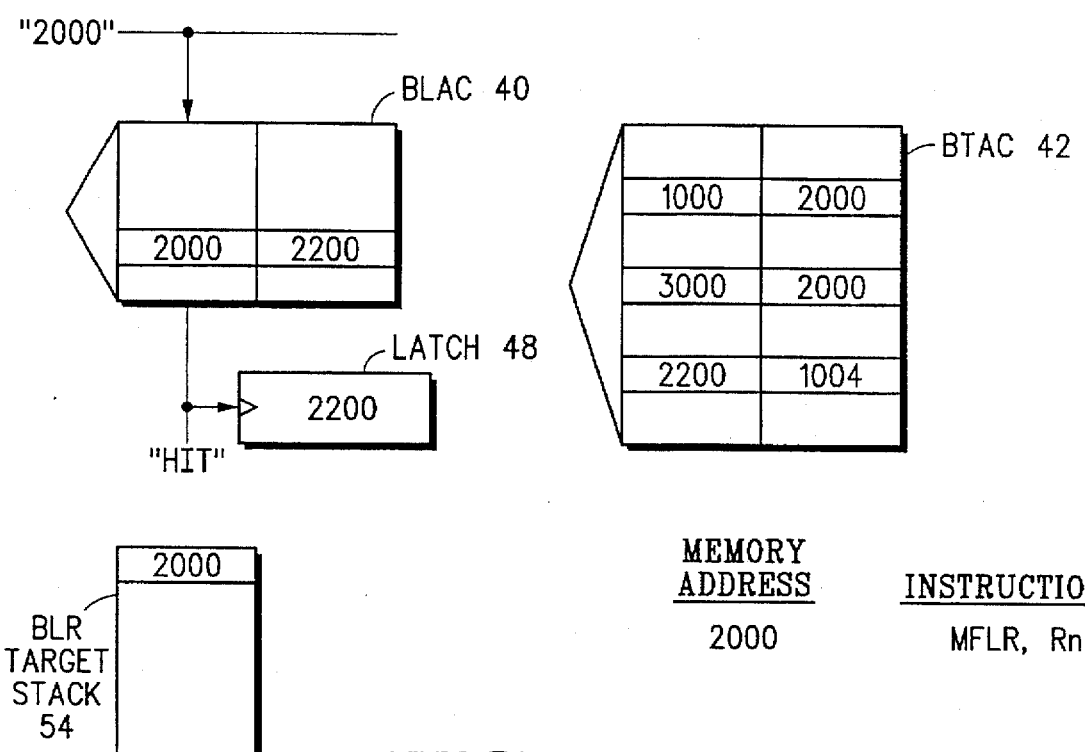

In FIG. 30, data processor 10 begins processing the first instruction of subroutine 52. The CAM cells within BLAC 40 generate a HIT signal when presented with the address of the move from link register instruction. Therefore, latch 48 samples and holds the EOS field ("2200") associated with the matching CALL ADDRESS.

Figure 31:
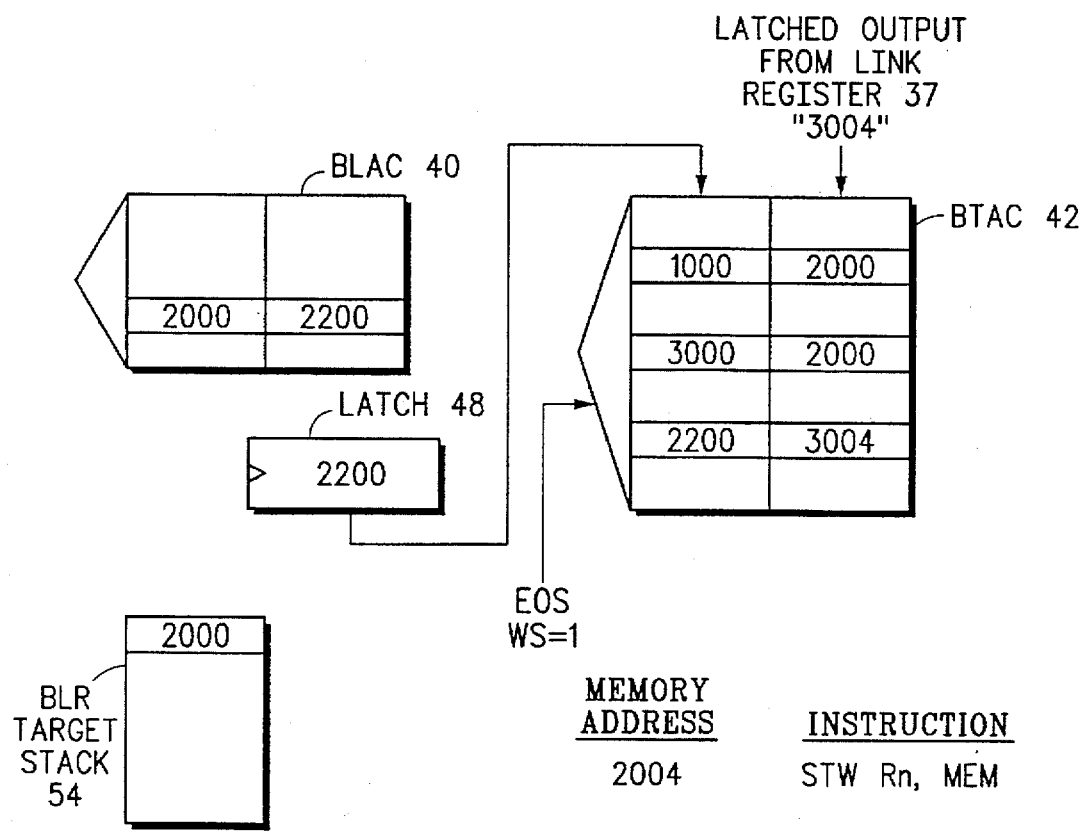

In FIG. 31, data processor 10 begins processing the second instruction of subroutine 52, a store instruction ("STW"). As described above, BLAC/BTAC control logic unit 44 asserts EOS WS the cycle following a BLAC "hit." BTAC 42 stores the output of latch 48 and the latched output of link register 37, "3004," into a selected entry of BTAC 42. BTAC 42 selects the entry whose CAM field matches the supplied EOS address field to avoid aliasing problems.

Here, an advantage of the second embodiment of the disclosed invention is illustrated. In FIG. 30, BLAC 40 is already loaded with the first and last address of subroutine 52 from a previous call. (As depicted in FIGS. 20 through 22, this previous call was from a different point in computer program 50.) Consequently, sequencer unit 18 is able to store a fetch address-target address pair in BTAC 42 immediately following the "hit" in BLAC 40. Sequencer unit 18 does not need to wait until it processes the branch to link register instruction depicted in FIG. 32 to determine the address of the final instruction of subroutine 52.

Figure 32:
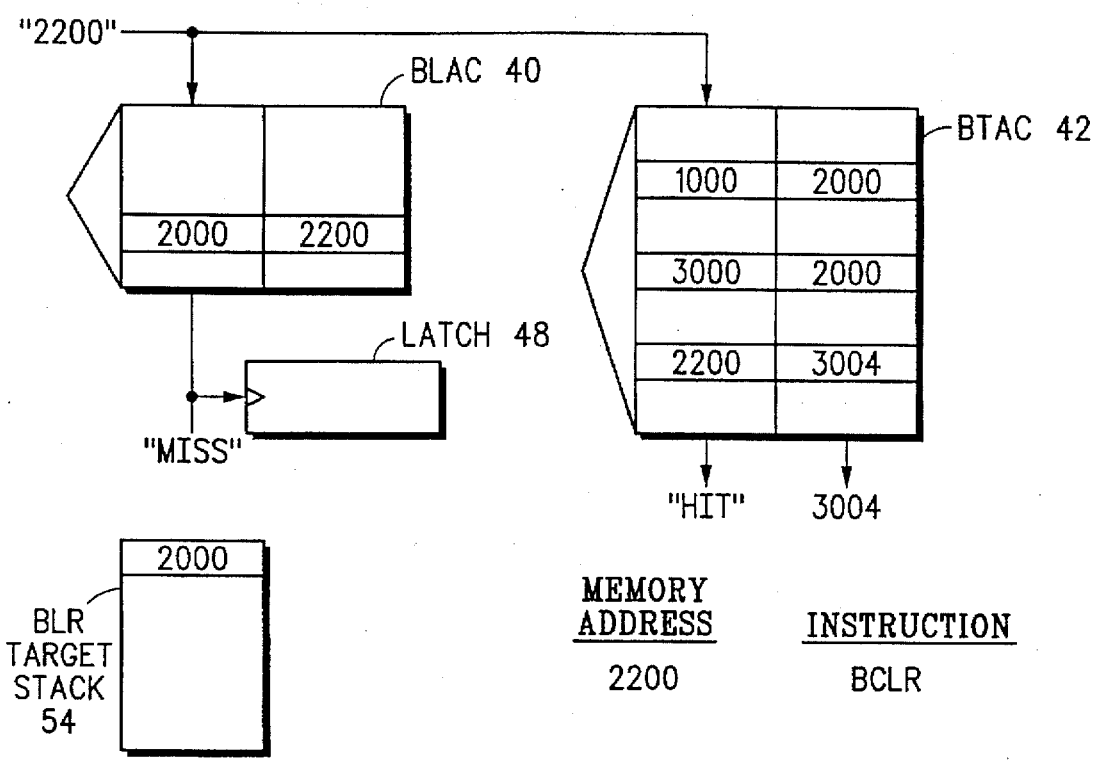

In FIG. 32, data processor 10 executes the branch to link register instruction ("BCLR") at the end of subroutine 52 for the third time. Now, the instruction pointer "hits" in BTAC 42, outputting the TARGET FETCH ADDRESS, "3004." Therefore, data processor 10 branches to the instruction stored at memory address "1004" before processing the branch to link register instruction any further. This branch prediction methodology ensures that data processor 10 has a steady supply of instructions to process.

Figure 33:
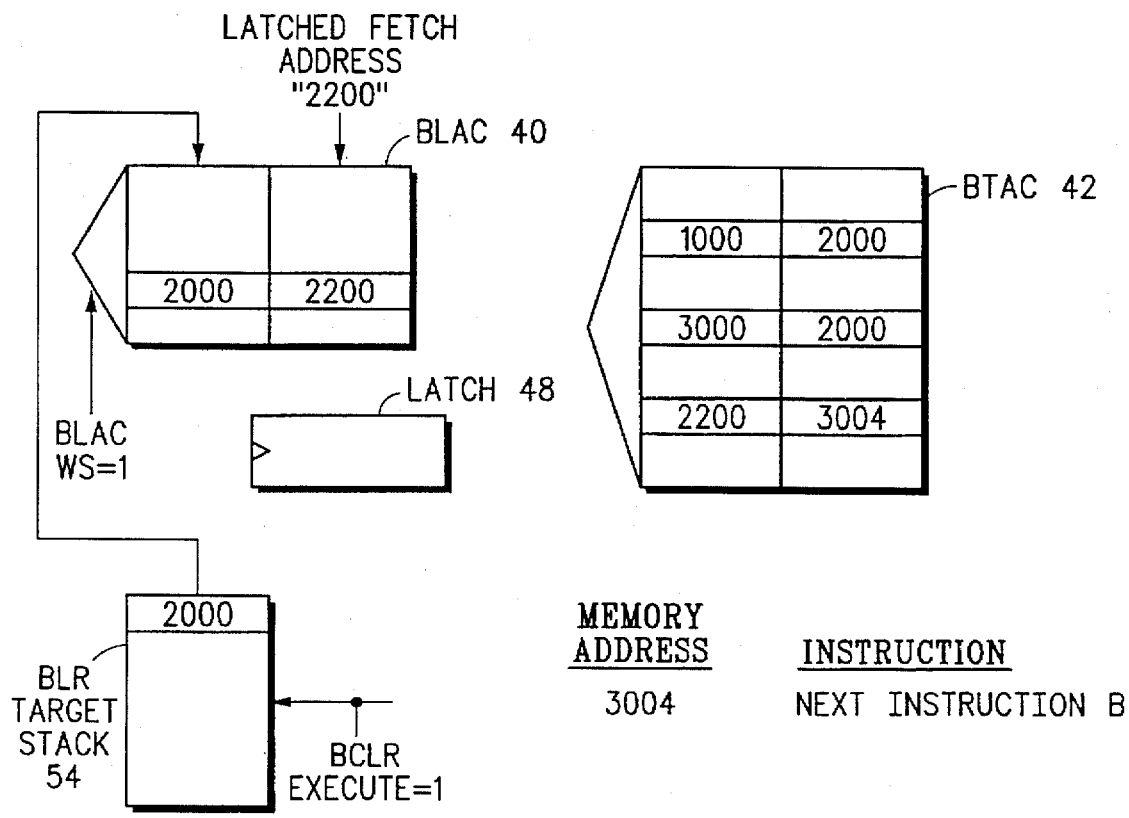

In FIG. 33, data processor 10 returns from subroutine 52, executing the instruction following the previous call instruction, NEXT INSTRUCTION B. As described above, BLAC/BTAC control logic unit 44 asserts the control signal BLAC WS when it encounters a BCLR instruction. BLAC 40 stores the output of BLR target stack 54 and the latched fetch address into the CAM field and into the RAM field, respectively, of a selected entry. Sequencer unit 18 also asserts BCLR EXECUTE causing BLR target stack 54 to "pop off" its newest entry.

Here, another advantage of the second embodiment of the disclosed invention is illustrated. In FIG. 33, sequencer unit 18 loads the same address pair into BLAC 40 as it loaded into BLAC 40 in connection with FIG.s 20 through 27. In general, sequencer unit 18 stores a single address pair into BLAC 40 for each subroutine it executes in the second embodiment. Conversely, sequencer unit 18 stores a single address pair into BLAC 40 for each subroutine call it executes in the first embodiment. Consequently, BLAC 40 can be made smaller in the second embodiment relative to the first embodiment depicted in FIG. 3.

Both embodiments depicted in FIG.s 3 and 19 enable data processor 10 to accurately predict the target address of a subroutine return instruction before data processor 10 actually executes the instruction. Data processor 10 is thereby able to fetch a continuous stream of instructions for execution. This instruction stream is only infrequently interrupted by miss-predicted branch instructions. However, the two embodiments may be incorporated into data processors having slightly different design objectives. For instance, the first embodiment may be suited to applications in which size or complexity is a critical design parameter. The first embodiment of the disclosed invention does not require space to accommodate a LIFO stack nor its inherent control circuitry to operate. Conversely, the second embodiment may be suited to applications in which branch prediction performance is a critical design parameter. The second embodiment of the disclosed invention is able to predict the return address of a branch to link register instruction more often than is the first embodiment. As described above, the second embodiment of the disclosed invention can predict the rerurn address of a subroutine once the subroutine has been called by any other location in the computer program.

Although the present invention has been described with reference to a specific embodiment, further modifications and improvements will occur to those skilled in the art. For instance, the disclosed invention may be incorporated into data processors traditionally classified as complex instruction set computers or CISC machines. Certain functional units may be omitted in certain embodiments or relocated to other areas of data processor 10. It is to be understood therefore, that the invention encompasses all such modifications that do not depart from the spirit and scope of the invention as defined in the appended claims.

What is claimed is:

1. A method of operating a data processor comprising the steps of:

during a first time period, executing a subroutine call instruction in the data processor, the subroutine call instruction comprising an operand, the operand indexing a subroutine;

executing the subroutine in the data processor;

executing a subroutine return instruction in the data processor;

storing a first data pair in a memory array, a first portion of the first data pair indexing the subroutine call instruction, a second portion of the first data pair indexing the subroutine return instruction;

during a second time period subsequent to the first time period, fetching the subroutine call instruction in the data processor;

reading the second portion of the first data pair from the memory array; and storing a second data pair in a branch target address cache of the data processor, the second data pair comprising the second portion of the first data pair and the operand.

2. The method of claim 1 wherein the operand is stored in an architectural register of the data processor.

3. The method of claim 2 further comprising the step of storing the tirst portion of the first data pair in a last-in-first-out ("LIFO") queue prior to the step of storing the first data pair in the memory array and wherein the first portion of the first data pair comprises the operand.

4. The method of claim 1 further comprising the step of storing the first portion of the first data pair in a last-in-first-out ("LIFO") queue prior to the step of storing the first data pair in the memory array and wherein the first portion of the first data pair comprises the operand.

\* \* \* \* \*